(12) United States Patent
Neubauer et al.

(10) Patent No.: US 7,499,850 B1
(45) Date of Patent: Mar. 3, 2009

(54) GENERATING A LOGICAL MODEL OF OBJECTS FROM A REPRESENTATION OF LINGUISTIC CONCEPTS FOR USE IN SOFTWARE MODEL GENERATION

(75) Inventors: Ronald Jay Neubauer, Thousand Oaks, CA (US); Ted Franklin Gladieux, Irvine, CA (US); Donald Edward Baisley, Laguna Hills, CA (US)

(73) Assignee: Microsoft Corporation, Redmond, WA (US)

( * ) Notice: Subject to any disclaimer, the term of this patent is extended or adjusted under 35 U.S.C. 154(b) by 747 days.

(21) Appl. No.: 10/860,672

(22) Filed: Jun. 3, 2004

(51) Int. Cl.
*G06F 17/27* (2006.01)
*G06F 17/21* (2006.01)
*G06F 17/00* (2006.01)

(52) U.S. Cl. .............. 704/9; 704/10; 707/102
(58) Field of Classification Search .............. 704/4
See application file for complete search history.

(56) References Cited

U.S. PATENT DOCUMENTS

| | | | |
|---|---|---|---|
| 4,974,191 A | 11/1990 | Amirghodsi | |
| 5,167,009 A | 11/1992 | Skeirik | |
| 5,748,974 A | 5/1998 | Johnson | |
| 6,023,669 A * | 2/2000 | Suda et al. | 704/2 |
| 6,173,441 B1 | 1/2001 | Klein | |
| 6,523,172 B1 | 2/2003 | Martinez-Guerra | |
| 6,587,849 B1 | 7/2003 | Mason | |
| 6,754,321 B1 | 6/2004 | Innes | |
| 6,789,252 B1 | 9/2004 | Burke | |
| 7,020,869 B2 | 3/2006 | Abrari | |
| 7,185,016 B1 | 2/2007 | Rasmussen | |
| 7,233,915 B2 | 6/2007 | Metcalfe | |
| 2001/0051868 A1 * | 12/2001 | Witschel | 704/9 |
| 2002/0107889 A1 | 8/2002 | Stone | |
| 2003/0097363 A1 | 5/2003 | Dorsey | |
| 2003/0216919 A1 | 11/2003 | Roushar | |
| 2003/0229605 A1 * | 12/2003 | Herrera et al. | 706/47 |
| 2004/0030421 A1 | 2/2004 | Haley | |
| 2004/0210445 A1 | 10/2004 | Veronese | |
| 2005/0096908 A1 * | 5/2005 | Bacchiani et al. | 704/257 |
| 2005/0108001 A1 | 5/2005 | Aarskog | |
| 2005/0246157 A1 | 11/2005 | Baisley | |
| 2005/0246371 A1 | 11/2005 | Baisley | |
| 2005/0289560 A1 | 12/2005 | Sedogbo | |
| 2006/0026576 A1 | 2/2006 | Baisley | |

OTHER PUBLICATIONS

Halpin, "Object Role Modeling: An Overview", Microsoft White Paper, Nov. 2001, Available at: http://msdn.microsoft.com/en-us/library/aa290383.aspx.*

(Continued)

*Primary Examiner*—David R Hudspeth
*Assistant Examiner*—Brian L Albertalli
(74) *Attorney, Agent, or Firm*—Workman Nydegger

(57) ABSTRACT

An embodiment of the present invention is a method for generating a logical model of objects from a representation of linguistic concepts. Packages of elements representing rule specifications expressed with linguistic concepts are received as input. The packages comprise at least one of the following: terms, names, sentence forms, mathematical function forms, nominal restrictive forms, identity criteria, and expressions. The packages are processed to generate a logical model of objects.

39 Claims, 22 Drawing Sheets

OTHER PUBLICATIONS

Bryant et al., From Natural Language Requirements to Executable Models of Software Components, Sep. 24, 2003, 8 pages.

Donald Baisley and Peter Cunnningham, Business Transformation Utilizing Business Rules Technologies, Dec. 2, 2003, 18 pages.

L. Mich et al, NL-OOPs: A Requirements Analysis Tool Based on Natural Language Processing, 2002, 11 pages.

Terry Halpin, Information modeling and Relational Database from Conceptual Analysis to Logical Design, pp. 412-454, Moragan Kaufmann Publishers, 2001.

Office Action dated Dec. 12, 2007 cited in related U.S. Appl. No. 10/837,299.

Office Action dated Oct. 19, 2007 cited in related U.S. Appl. No. 10/899,891.

Office Action dated Jun. 27, 2008 cited in related U.S. Appl. No. 10/899,891.

Perex-Gonzales et al. "GOOAL: A Graphic Object Oriented Analysis Laboratory" Nov. 2002, AMC OOPSLA '02, pp. 38-39.

Evans "A Comparison of Tule-Based and Machine Learning Methods for Identifying Non-Normal It", 2000, NPL 2000, LNCS 1835, pp. 233-240.

Office Action dated Oct. 3, 2008 cited in U.S. Appl. No. 10/837,299.

Office Action dated Oct. 5, 2007 cited in U.S. Appl. No. 10/831,679.

Office Action dated Jul. 10, 2008 cited in U.S. Appl. No. 10/831,679.

Office Action dated Nov. 28, 2007 cited in U.S. Appl. No. 10/908,452.

* cited by examiner

GENERATING A LOGICAL MODEL OF OBJECTS FROM A REPRESENTATION OF LINGUISTIC CONCEPTS FOR USE IN SOFTWARE MODEL GENERATION

BACKGROUND

1. Field of the Invention

Embodiments of the invention are in the field of natural language processing, and relate more specifically to generation of a logical model of objects from packages of information containing linguistic concepts expressed in natural language.

2. Description of Related Art

Natural language used by humans to communicate tends to be contextual and imprecise. To automate natural language processing using computerized methods, certain rules are usually imposed to confine the natural language expressions to a well-defined format. There are several applications that can provide an environment where natural language expressions may be expressed in an unambiguous format. One such application is business language.

Business language can be used to describe a business organization and the business rules that are applicable to the business organization. Business language statements can be parsed into linguistic structures that represent the statements in terms of formal logics, using linguistic techniques. These linguistic structures may include the terms and names that are to be used, the function forms that utilize this vocabulary, and the applicable business rules. Different portions of this vocabulary are captured in separate information packages.

A logical model representing a consolidated view of the business organization and business rules as captured as information in separate information packages would facilitate subsequent computer software generation. In addition, automatic generation of a logical model from the information packages will save time and avoid the problem of errors that would occur with manual procedures.

SUMMARY OF THE INVENTION

An embodiment of the present invention is a method for generating a logical model of objects from a representation of linguistic concepts. Packages of elements representing rule specifications expressed with linguistic concepts are received as input. The packages comprise at least one of the following: terms, names, sentence forms, mathematical function forms, nominal restrictive forms, identity criteria, and expressions. The packages are processed to generate a logical model of objects.

BRIEF DESCRIPTION OF THE DRAWINGS

The invention may best be understood by referring to the following description and accompanying drawings that are used to illustrate embodiments of the invention. In the drawings.

DESCRIPTION

Figure 1:
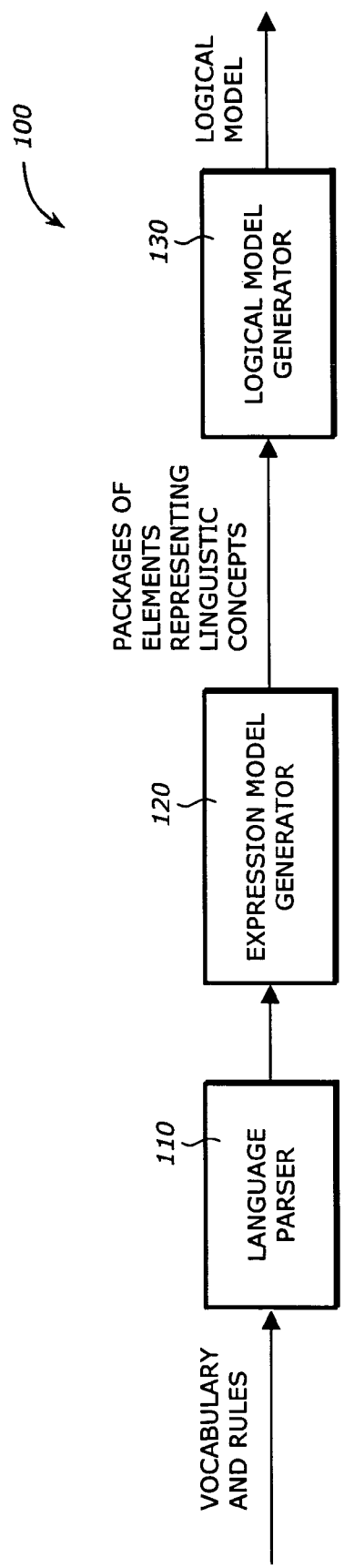
FIG. 1 is a diagram illustrating a system in which one embodiment of the invention can be practiced.

An embodiment of the present invention is a method for generating a logical model of objects from a representation of linguistic concepts. Packages of elements representing rule specifications expressed with linguistic concepts are received as input. The packages comprise at least one of the following: terms, names, sentence forms, mathematical function forms, nominal restrictive forms, identity criteria, and expressions. The packages are processed to generate a logical model of objects.

In one embodiment of the invention, the objects in the logical model represent business concepts and business rules.

In the following description, numerous specific details are set forth. However, it is understood that embodiments of the invention may be practiced without these specific details. In other instances, well-known circuits, structures, and techniques have not been shown in order not to obscure the understanding of this description.

Many relevant linguistic concepts are used in the following description. These concepts are developed using a linguistic terminology that includes a number of terms. These terms include "expression", "nominal expression", "term", "name", "numerical literal", "textual literal", "role expression", "sentence", "simple sentence", "complex sentence", "function form", "sentence form", "parametric operator", "interrogative operator", "propositional interrogative", "identification scheme", "type", "category", "role", "supertype", and "subtype".

An expression is a symbol or combination of symbols that means something. The meaning can be anything, including a proposition, a rule, a number, etc.

A nominal expression is an expression that names a thing or things.

A symbol is something representing, in the sense of meaning, something else.

A term is a symbol that denotes being of a type, i.e., a common noun.

Examples: "car" denoting a category of vehicle, "bank account".

A name is a symbol and a nominal expression; a symbol that names an individual thing, i.e., a proper noun. Examples: "California" naming a state of the United States, "Unisys" naming the company Unisys.

A numerical literal is a name that denotes a number using numerals. For example, "123" meaning the number 123.

A textual literal is a symbol and a nominal expression; a symbol that represents words, punctuation, textual characters or a sequence of any of these by literal presentation, as in quotation marks. For example, "hello" representing the word "hello".

A role expression is a nominal expression. A nominal expression consists primarily of a term given in place of a placeholder in an expression based on a function form, and consists secondarily of each operator (e.g., quantifier, pronominal operator, parametric operator, interrogative operator) and object modifier applied to the term together with any expression of instances specifically referenced by the term, or, if the denoted type's range is restricted using a nominal restrictive form, that nominal restrictive form along with the expression of each argument to the function delineated by that form. Examples: "a checking account" in the expression "a checking account has the overdraw limit ($1000.00)"; "the overdraw limit ($1000.00)" in the expression "a checking account has the overdraw limit ($1000.00)".

A mathematical expression is a category of nominal expression. It is stated using a mathematical form and includes a nominal expression for each placeholder of the mathematical form.

A sentence is an expression that denotes a proposition (possibly an open or interrogative proposition).

A simple sentence is a sentence that is stated using a single sentence form—no logical connectives. It includes a nominal expression for each placeholder of the sentence form. Example: "Each person has a name".

A complex sentence is a sentence that combines other sentences using a logical connective such as if, and, or, etc. Example: "Each American citizen has a name and a social security number".

A function form is a symbol and an expression; a complex symbol that is a sequence of typed placeholders and words interspersed that delineates a function and serves as a form for invoking the function in expressions. Each typed placeholder appears in the sequence as a term denoting the placeholder's type specially marked in some way (such as by underlining).

A nominal restrictive form is a category of function form. A function form that can be the form of a nominal expression and that includes a placeholder representing the function result of the delineated function.

Examples: "doctor of patient" as form of expressing the doctor or doctors that a patient has; "patient seen by doctor" as form of expressing the patients that a doctor sees.

A mathematical form is a category of function form. A function form that can be the form of a nominal expression and that does not include a placeholder representing the function result of the delineated function.

Examples: "number+number" as in "2+3" giving 5; "number of days after date" as in "6 days after Dec. 25, 2003" giving another date.

A sentence form is a category of function form that delineates a propositional function. Example: "vendor charges price for product".

A placeholder is an open position with a designated type in a functional form that stands in place of a nominal expression that would appear in an expression based on that form. A placeholder represents an argument or a result in the function delineated by the functional form.

Examples: doctor and patient in "doctor sees patient"; vendor, price and product in "vendor changes price for product"

An argument is an independent variable in a function.

A parametric operator is an operator that when expressed with a term denotes a discourse referent determined by future discourse context, with singular quantification. Example: "a given" in "Each medical receptionist is authorized to provide what doctor sees a given patient".

An identity criterion, also called identification scheme or reference scheme, is a scheme by which a thing of some type can be identified by facts about the thing that relate the thing to signifiers or to other things identified by signifiers. The identifying scheme comprises of the set of terms that correspond to the signifiers. Example: an employee may be identified by employee number.

A fact is a proposition that is accepted as true.

A rule is an authoritative, prescribed direction for conduct. For example, one of the regulations governing procedure in a legislative body or a regulation observed by the players in a game, sport, or contest.

A category is a role of a type in a categorization relation to a more general type. The category classifies a subset of the instances of the more general type based on some delimiting characteristic.

A type is a classification of things (often by category or by role). A category is a role of a type in a categorization relation to a more general type. The category classifies a subset of the instances of the more general type based on some delimiting characteristic. Example: checking account is a category of account.

A role is a role of a type whose essential characteristic is that its instances play some part, or are put to some use, in some situation. The type classifies an instance based, not on a distinguishing characteristic of the instance itself (as with a category), but on some fact that involves the instance. Example: destination city is a role of a city.

A supertype is a role of a type used in relation to another type such that the other type is a category or role of the supertype, directly or indirectly. Each instance of the other type is an instance of the supertype. Examples: animal is a supertype of person (assuming person is a category of animal) and person is a supertype of driver (assuming driver is a role of a person).

A subtype is a role of a type used in relation to another type such that the subtype is a category or role of the other type, directly or indirectly. Each instance of the subtype is an instance of the other type. This is the inverse of supertype.

Examples: person is a subtype of animal (assuming person is a category of animal) and driver is a subtype of person (assuming driver is a role of a person).

In one embodiment, the invention is implemented using an object-oriented technique. The object-oriented technique is a method to represent a system using objects and associations between objects. The technique involves the use of "class", "association", "attribute". Although these terms are commonly known, they are defined in the following for clarification.

A class is an abstract concept representing a real world thing of interest to the system, such as a person, a router in a network, etc. A class is a template that defines the behavior and attributes that a particular type of object possesses. A class can be the base for other classes. The behavior of the object is the collective set of operations that the object can perform, which are defined in the respective class. The state of the object is defined by the values of its attributes at any given time.

An association represents a relationship between objects.

An attribute represents some aspect of an object. For example, the color of an automobile, the date of birth of a person. Each attribute has a type that defines the range of values that the attribute can have.

FIG. 1 is a diagram illustrating a system 100 in which one embodiment of the invention can be practiced. The system 100 comprises a language parser 110, an expression model generator 120, and a logical model generator 130 of the present invention. The system 100 may be implemented by software or hardware, or a combination of hardware and software.

The language parser 110 receives as inputs a set of symbols of a natural language, information regarding the symbols, and a set of rule statements expressed using the set of symbols. Information regarding the symbols may include relationships between certain symbols (such as synonymy, generalization, specialization), and identity criteria. The rule statements are in a linguistic form having a predefined syntax or format. A rule statement may represent an authorization to request or to provide information. The language parser parses each of the rule statements with respect to the rules of the language and outputs a language-based structure that identifies the symbols used and their interrelationships with respect to the sentence structure.

The expression model generator 120 receives as input the language-based structure of each rule statement and generates a language-neutral expression model that represents the expression of each rule independently of the ordering of symbols or of the grammatical structure. The expression model generator 120 outputs the language-neutral expression model as packages of elements representing linguistic concepts.

The logical model generator 130 of the present invention receives as input the packages of elements representing specifications of the rules expressed with linguistic concepts and generates a logical model that represents the semantics of each rule in terms of formal logics. The logical model generator 130 functions may include all the tasks described herein in terms of processes.

Figure 2:
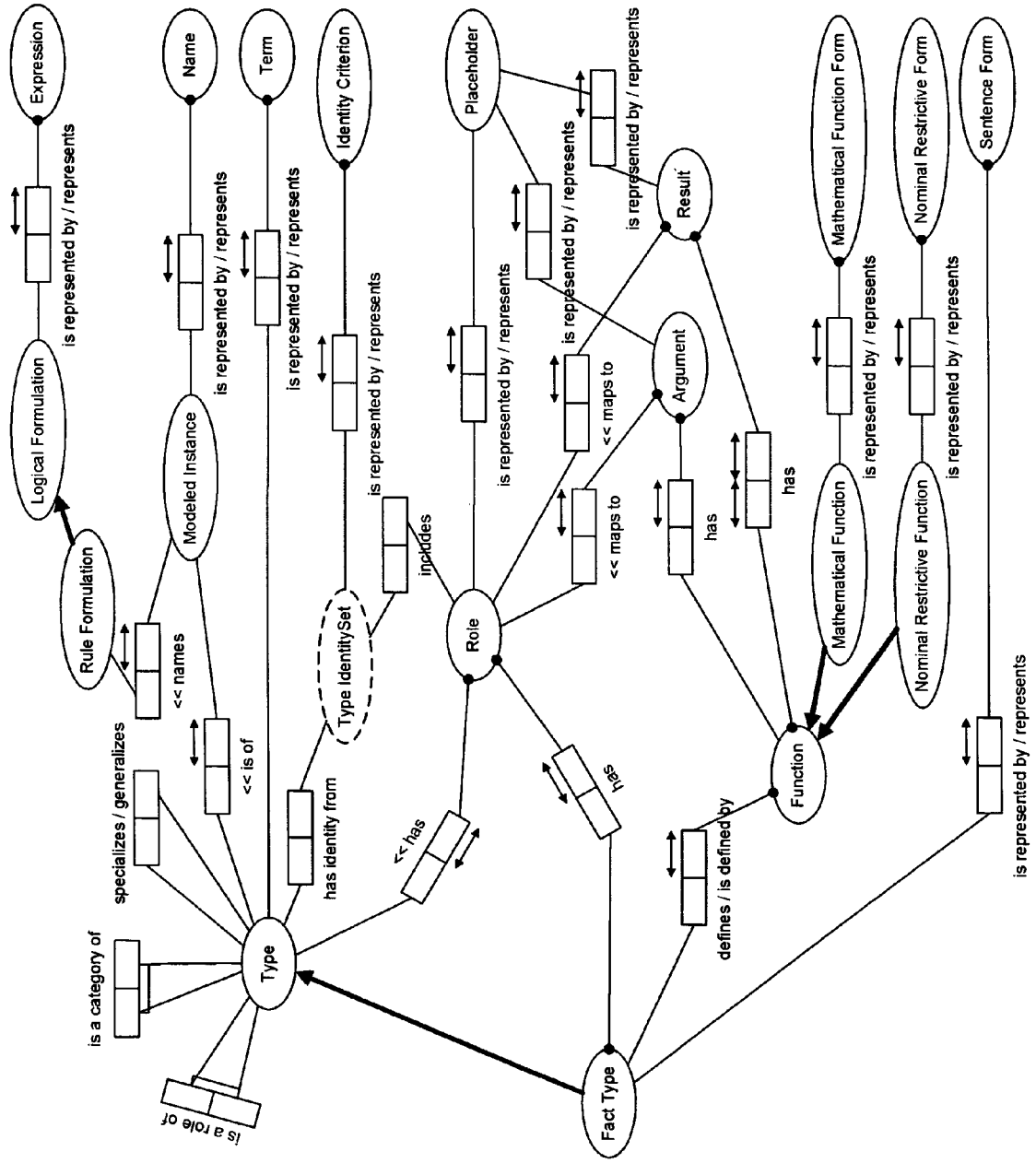
FIG. 2 is a diagram illustrating a logical model that can be generated by an embodiment of the invention.

FIG. 2 is a diagram illustrating an Object Role Modeling (ORM) representation of a logical model that can be generated by an embodiment of the present invention, such as the logical model generator 130 in FIG. 1. ORM is a well-known method for designing and querying database models at the conceptual level, where the application is described in terms easily understood by non-technical users. In FIG. 2, the objects shown on the right hand side, namely, Expression, Name, Term, Identity Criterion, Placeholder, Mathematical Function Form, Nominal Restrictive Form, and Sentence Form are linguistic elements that are provided as inputs. The remaining objects shown in FIG. 2 are logical objects generated by an embodiment of the present invention. A line with two rectangular boxes in the middle connecting two objects represents an association between the two objects, with the rectangular boxes indicating the nature of the relationship. For example, a sentence form represents a fact type, and a fact type is represented by a sentence form. A Fact Type is a subclass of the class Type (this relationship is indicated by an arrow between the two objects). Two sentence forms represent the same fact type if they are the same in every way, or if they differ only in that their placeholder terms are synonymous instead of identical, or if they have been explicitly defined as being synonymous. Fact type specialization is inferred when a sentence form is the same as another sentence form except that its represented roles differ only in having types that are specializations of the corresponding other role types. Two function forms are implicit synonyms if they are of the same type of function forms and their placeholder terms in corresponding positions are synonyms and the text connecting the terms are identical. Two linguistic elements are explicit synonyms if they have been declared as explicit synonyms.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may recursively call itself. When the called process terminates, control is returned to the calling process. When all the recursive calls have ended, control is returned to the initial calling process. A process may correspond to a method, a program, a procedure, etc.

Figure 3:
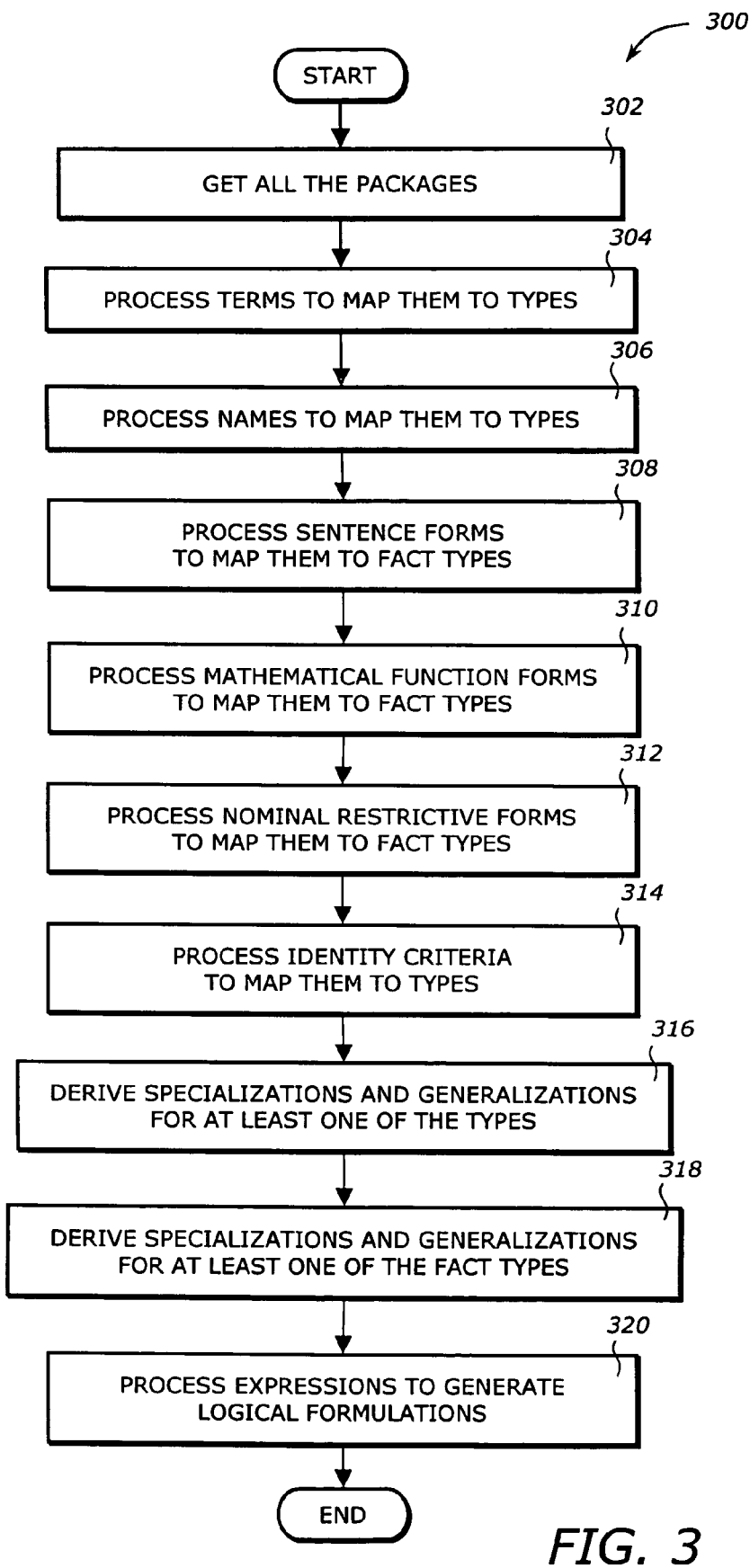
FIG. 3 is a flowchart illustrating a process 300 for generating a logical model from packages of information containing elements representing linguistic concepts.

FIG. 3 is a flowchart illustrating a process 300 for generating a logical model from packages of information containing elements representing linguistic concepts. Upon Start, process 300 obtains all the information packages (block 302). Process 300 processes the terms included in the packages to associate each of the terms with a type (block 304). Process 300 processes the names included in the packages to map each of the names to a type via an association with a modeled instance, each of the names being associated with a term of the processed terms (block 306). Process 300 processes the sentence forms included in the packages to associate each of the sentence forms with a fact type (block 308). Process 300 processes the mathematical function forms included in the packages to map each of the mathematical function forms to a fact type via an association with a mathematical function (block 310). Process 300 processes the nominal restrictive forms included the packages to a fact type via an association with a nominal restrictive function (block 312). Process 300 processes the identity criteria included in the packages to map each of the identity criteria to a type via an association with a type identity set (block 314). Then, process 300 derives type specializations and generalizations for at least one of the types (block 316) and derives fact type specializations and generalizations for at least one of the fact types (block 318). Process 300 processes the expressions included in the packages to generate logical formulations (block 320). Then, process 300 terminates.

Figure 4:
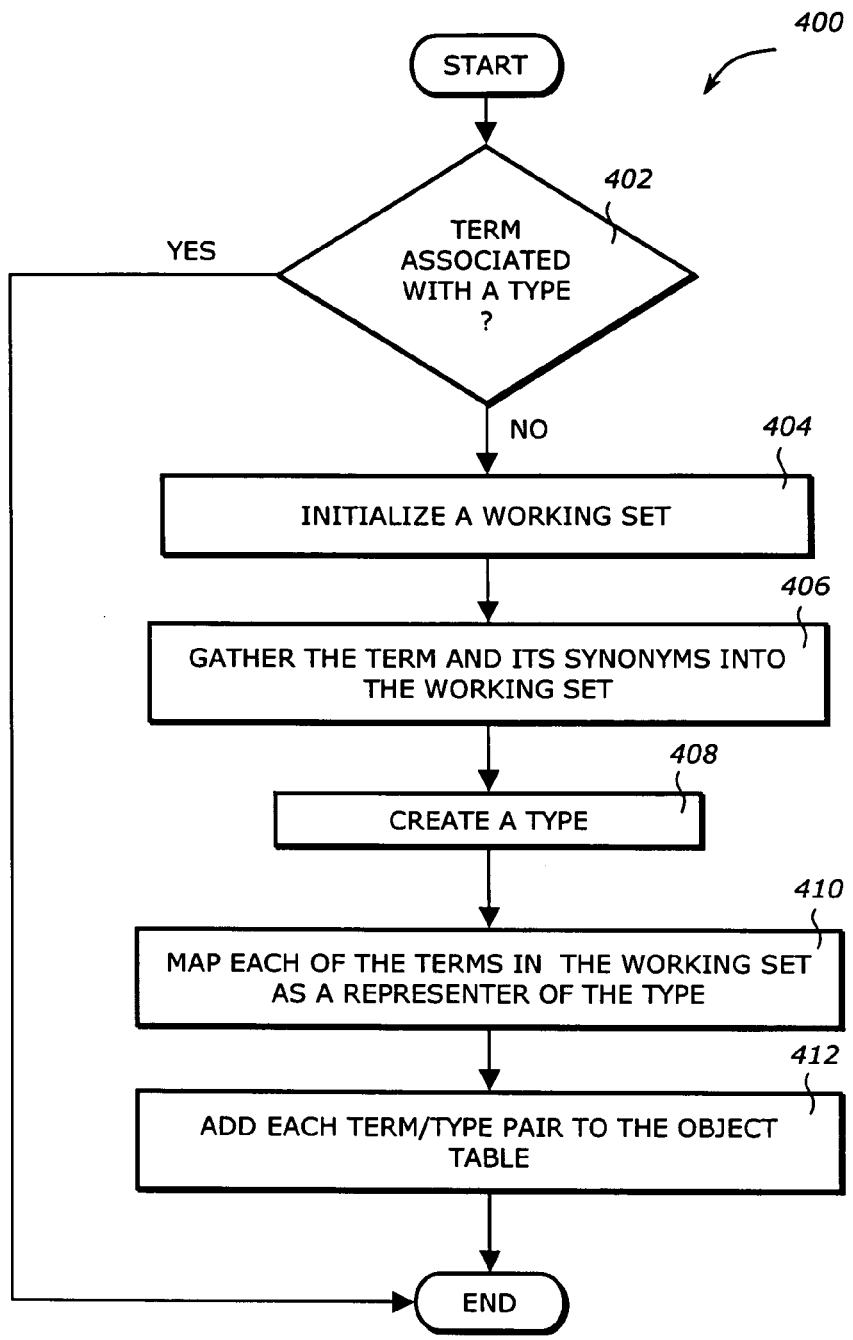
FIG. 4 is a flowchart illustrating a process 400 for processing a term included in a package.

FIG. 4 is a flowchart illustrating a process 400 for processing a term included in a package. Block 304 of process 300 (FIG. 3) calls process 400 each time a term included in a package is to be processed and passes the term to process 400. Upon Start, process 400 checks whether the term is already mapped to a type (block 402). If it is, process 400 terminates. Otherwise, process 400 initializes a working set (block 404).

Process 400 gathers the term and its synonyms from each of the packages into the working set (block 406). Process 400 creates a type (block 408). Process 400 maps each of the terms in the working set to the type as a definer of the type (block 410). Process 400 then adds each pair of term and type to the object table (block 412). Process 400 then terminates. Note that block 412 is an optional implementation detail. The operation in block 412 is used in one embodiment to keep track of the objects and their associations using a single object table. The object table provides an efficient way of searching for an existing object and its associations and may be implemented as a hash table.

Figure 5:
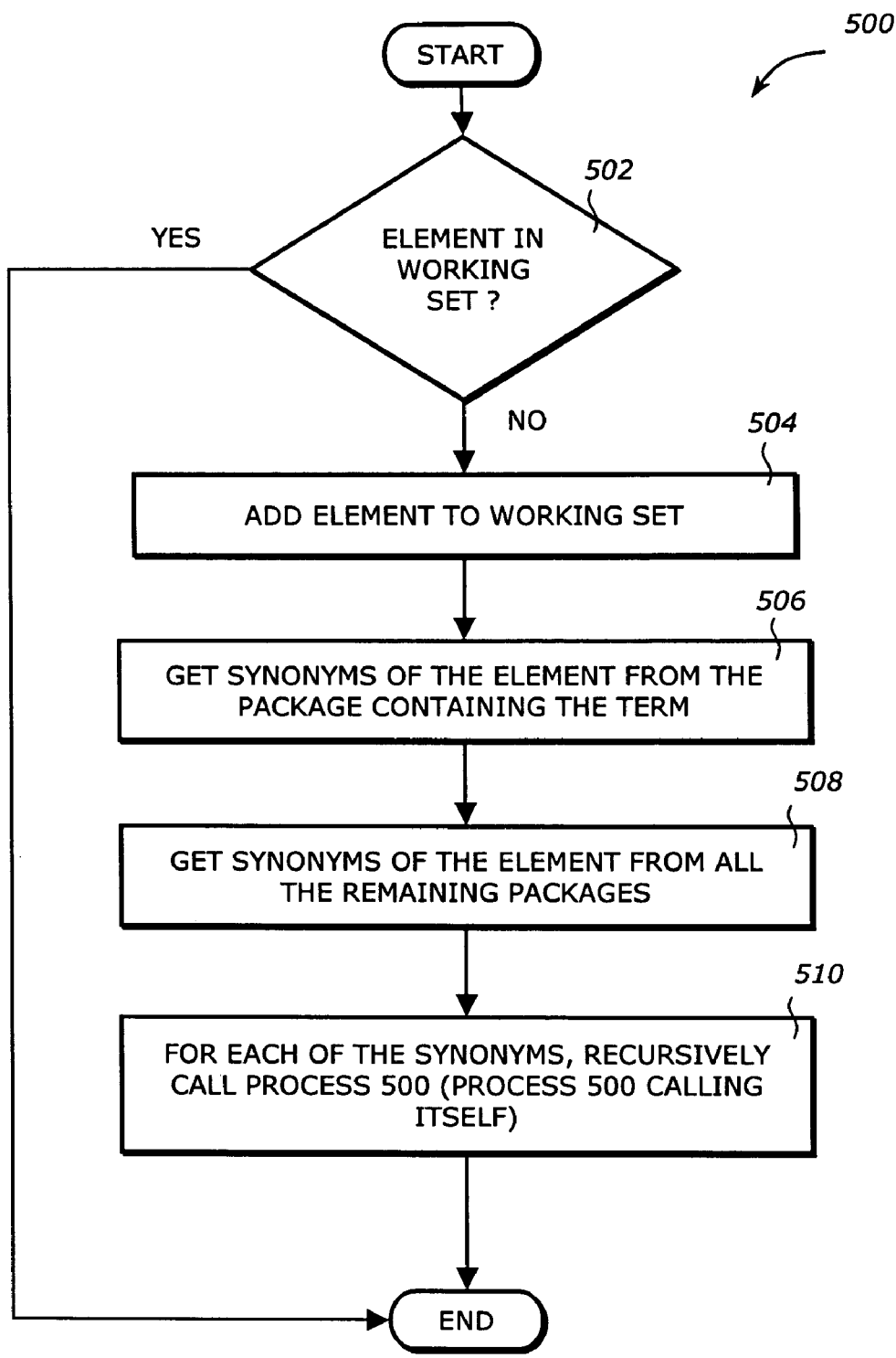
FIG. 5 is a flowchart illustrating a process 500 for gathering a term (or a name) and its synonyms into a working set.

FIG. 5 is a flowchart illustrating a process 500 for gathering a linguistic element (term, name, sentence form, mathematical function form, or nominal restrictive form) and its synonyms from all the packages into a working set. Process 500 represents block 406 (FIG. 4) when the linguistic element is a term, block 606 of process 600 (FIG. 6) when the linguistic element is a name, block 706 of process 700 (FIG. 7) when the linguistic element is a sentence form, block 1006 of process 1000 (FIG. 10A) when the linguistic element is a mathematical function form, block 1206 of process 1200 (FIG. 12A) when the linguistic element is a nominal restrictive form.

Upon Start, process 500 checks whether the current element is already in the working set (block 502). If it is, process 500 terminates. Otherwise, process 500 adds the current element to the working set (block 504). Process 500 gets synonyms of the current element from the package that contains the current element (block 506). The Next, process 500 gets synonyms of the current element from the other packages (block 508). Note that the synonyms obtained in block 506 and block 508 include elements that have the same reading as the current element, explicit synonyms, and implicit synonyms. For each of the elements obtained in block 506 and block 508, process 500 recursively calls itself using such element as the current element (block 510).

Figure 6:
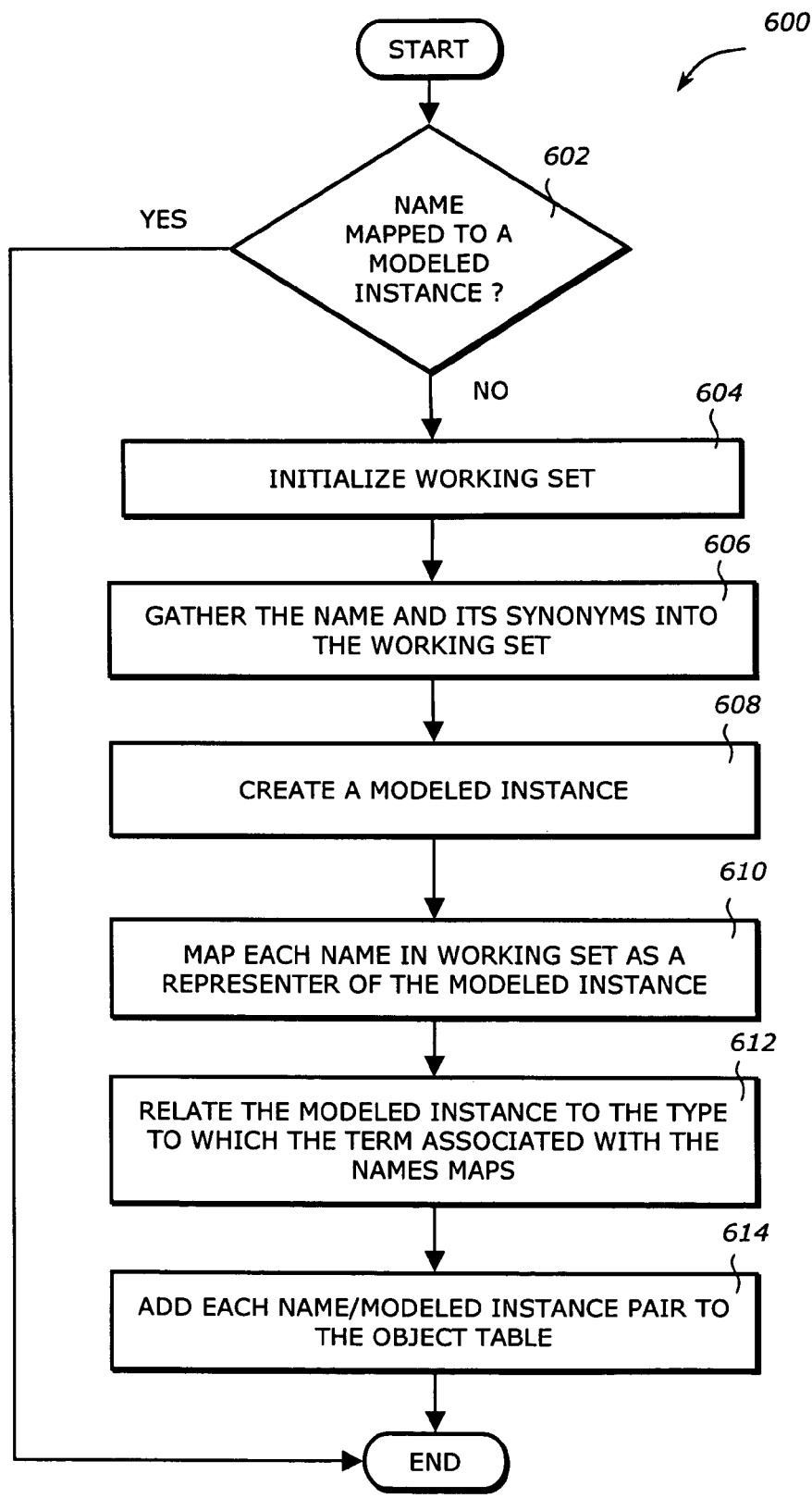
FIG. 6 is a flowchart illustrating a process 600 for processing a name included in a package.

FIG. 6 is a flowchart illustrating a process 600 for processing a name included in a package. Block 306 of process 300 (FIG. 3) calls process 600 each time a name included in a package is to be processed and passes the name to process 600. Upon Start, process 600 checks whether the name is already mapped to a modeled instance (block 602). If it is, process 600 terminates. Otherwise, process 600 initializes a working set (block 604). Process 600 gathers the name and its synonyms from each of the packages into the working set (block 606). Process 600 creates a modeled instance (block 608). Process 600 maps each of the names in the working set to the modeled instance as a definer of the modeled instance (block 610). These names are instances of a term. The term is associated with a type (by block 304 of FIG. 3). Process 600 creates an association to relate the modeled instance to the type associated with the term whose instances are the names in the working set (block 612). Process 600 then adds each pair of name and modeled instance to the object table (block 614). Process 600 then terminates. Note that block 614 is an optional implementation detail, similar to block 412 in FIG. 4 discussed above.

Figure 7:
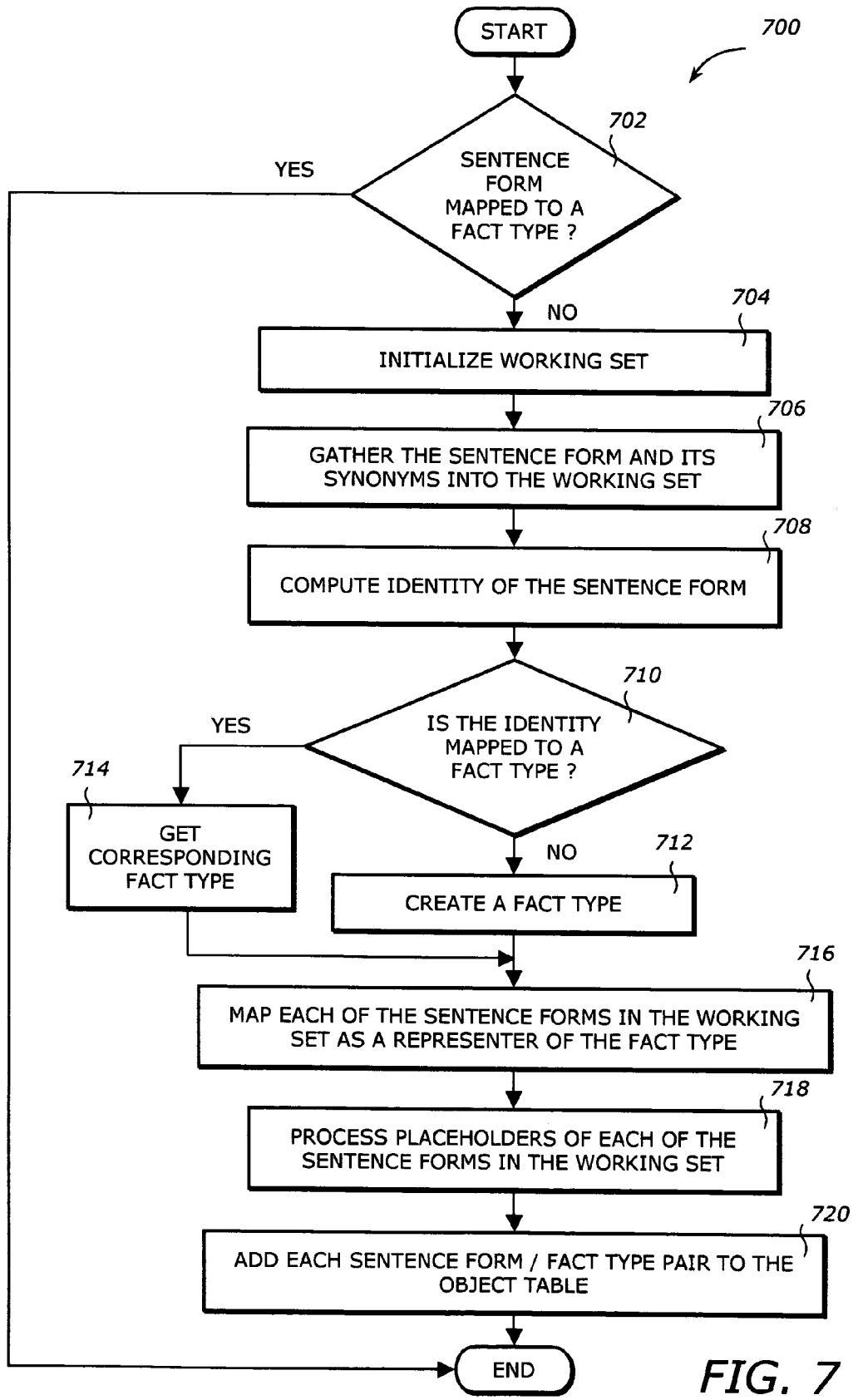
FIG. 7 is a flowchart illustrating a process 700 for processing a sentence form included in a package.

FIG. 7 is a flowchart illustrating a process 700 for processing a sentence form included in a package. Block 308 of process 300 (FIG. 3) calls process 700 each time a sentence form included in a package is to be processed and passes the sentence form to process 700. Upon Start, process 700 checks whether the sentence form is already mapped to a fact type (block 702). If it is, process 700 terminates. Otherwise, process 700 initializes a working set (block 704). Process 700 gathers the sentence form and its synonyms (which are also sentence forms) from each of the packages into the working set (block 706). Process 700 computes the logical identity of the sentence form (block 708). Next, process 700 checks whether this identity maps to a fact type (block 710). If it does, process 700 gets the mapped fact type (block 714) and proceeds to block 716. Other wise, process 700 creates a fact type (block 712). Process 700 creates an association between each of the sentence forms in the working set with the fact type, indicating that each of the sentence forms represents the fact type (block 716). Process 700 then processes the placeholders of each of the sentence forms in the working set (block 718). Process 700 adds each pair of sentence form and fact type to the object table (block 720). Process 600 then terminates. Note that block 720 is an optional implementation detail, similar to block 412 in FIG. 4 discussed above.

Figure 8:
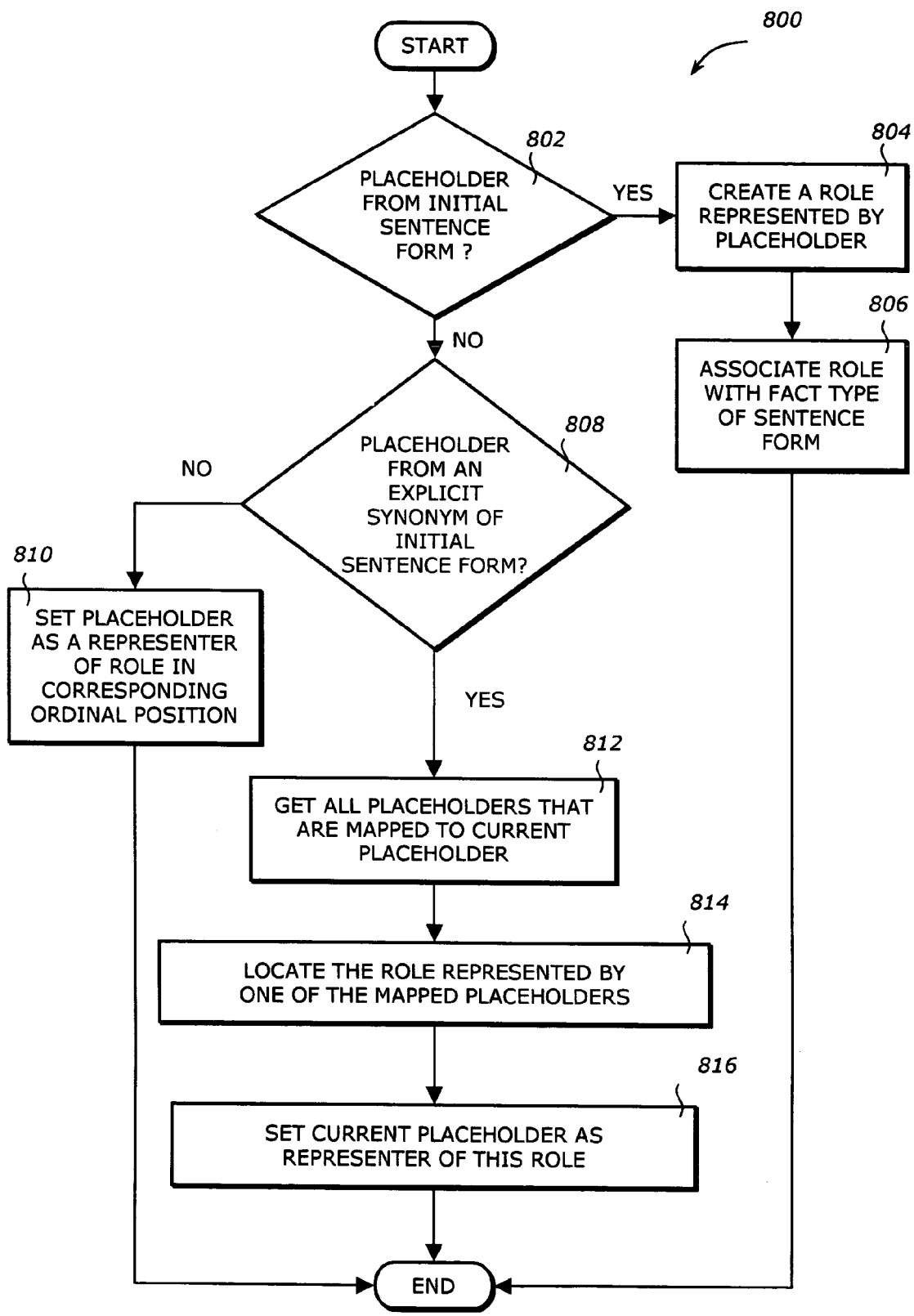
FIG. 8 is a flowchart illustrating a process 800 for processing a placeholder of a sentence form.

FIG. 8 is a flowchart illustrating a process 800 for processing a placeholder of a sentence form. Block 718 of process 700 (FIG. 7) calls process 800 each time a placeholder included in a sentence form is to be processed and passes the placeholder and the fact type to which the sentence form is mapped to process 800. Upon Start, process 800 checks whether the placeholder is from the initial sentence form (block 802). If it is, process 800 creates a role represented by the placeholder (block 804), then creates an association between the newly created role and the fact type represented by the sentence form, indicating that the newly created role has the fact type (block 806), then terminates. Otherwise, process 800 checks whether the placeholder is from an explicit synonym of the initial sentence form (block 808). If it is not, process 800 sets the placeholder as a representer of the role in the corresponding ordinal position (block 810) (note that the role is created in an earlier execution of process 800 when a placeholder in the initial sentence form is processed), then terminates. Otherwise, process 800 gets all placeholders that are mapped to the current placeholder (block 812). Process 800 locates the role represented by one of the mapped placeholders (block 814). Process 800 sets current placeholder as a representer of the located role (block 816). Process 800 then terminates.

Figure 9:
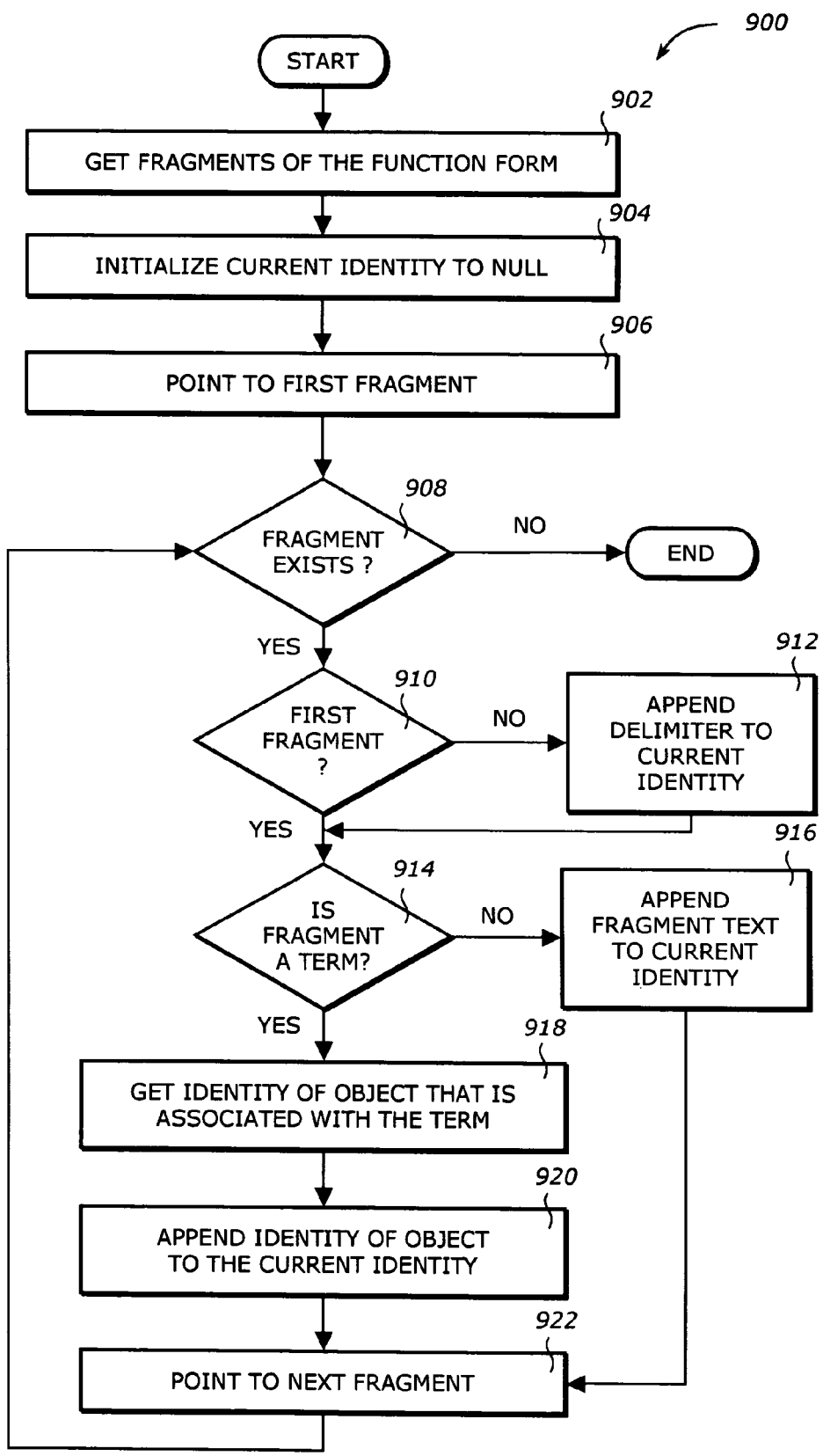
FIG. 9 is a flowchart illustrating a process 900 for computing the identity of a function form.

FIG. 9 is a flowchart illustrating a process 900 for computing the logical identity of a function form. Process 900 represents block 708 (FIG. 7) when the function form is a sentence form, block 1008 (FIG. 10A) when the function form is a mathematical function form, and block 1208 (FIG. 12A) when the function form is a nominal restrictive form. The identity of the function form is computed by replacing each of the terms in the function form with the identity of the logical object that is associated with such term, while keeping the non-terms in the function form intact. Note that a term and its synonyms represent the same logical object, thus have the same identity (the identity may be implemented as a string of characters and/or numbers).

Upon Start, process 900 gets the fragments of the function form (block 902). Process 900 initialize a current identity to null (block 904). Process 900 points to the first fragment (block 906). Process 900 checks whether the fragment exists (block 908). If it does not exist, process 900 terminates. Otherwise, process 900 checks whether the fragment is the first fragment of the function form (block 910). If it is not, process 900 appends a delimiter to the current identity (block 912) before continuing to block 914. Otherwise, process 900 proceeds directly to check whether the fragment is a term (block 914). If it is not a term, process 900 appends the text of the fragment to the current identity (block 916) then continues to block 922. Otherwise, process 900 gets the identity of the logical object that is associated with the term (block 918), then process 900 appends the identity of the logical object to the current identity (block 920). Process 900 then points to the next fragment (block 922) then loops back to block 908.

Figure 10A:
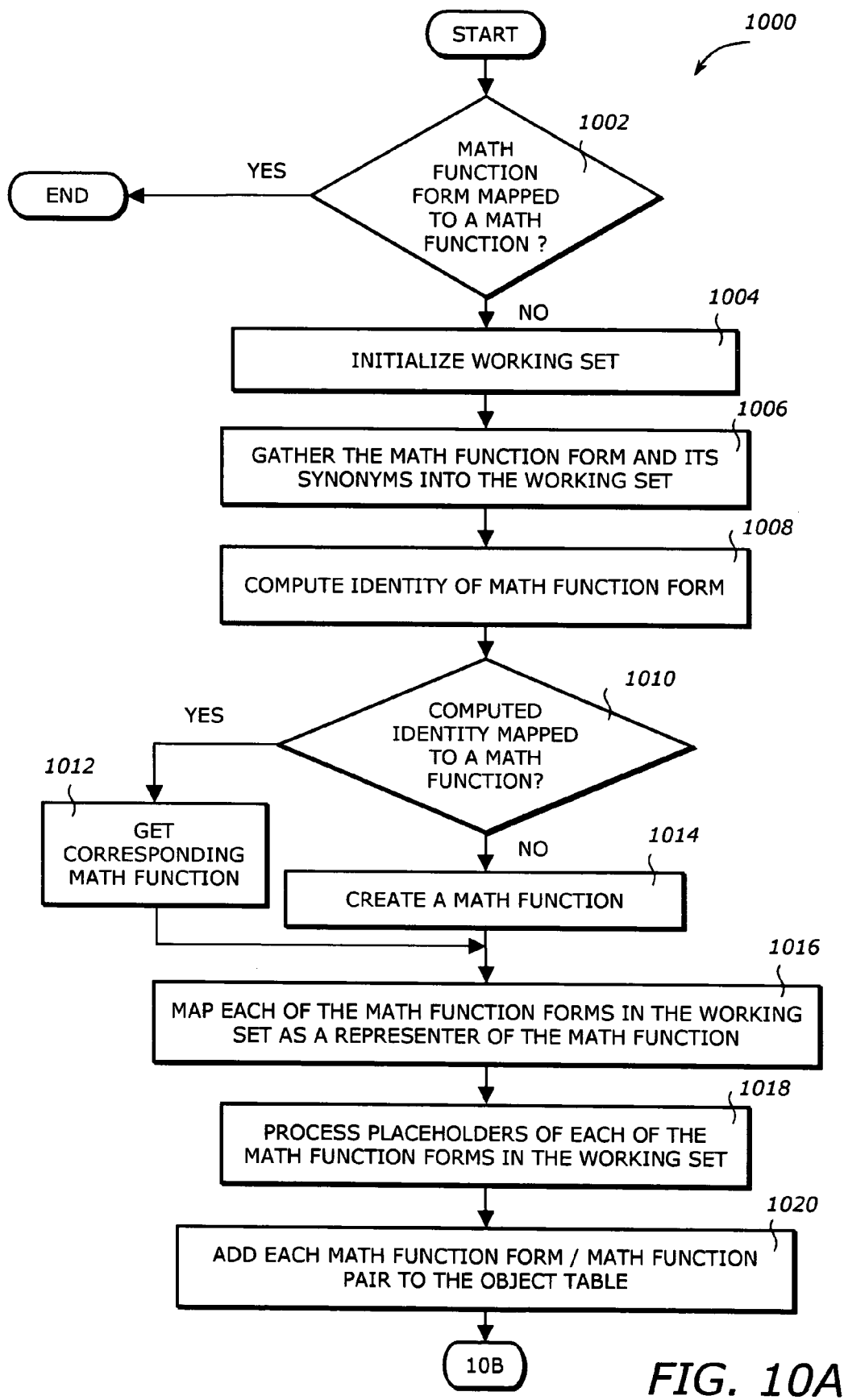
FIGS. 10A and 10B are a flowchart illustrating a process 1000 for processing a mathematical function form included in a package to map the mathematical function form to a fact type via an association with a mathematical function.
Figure 10B:
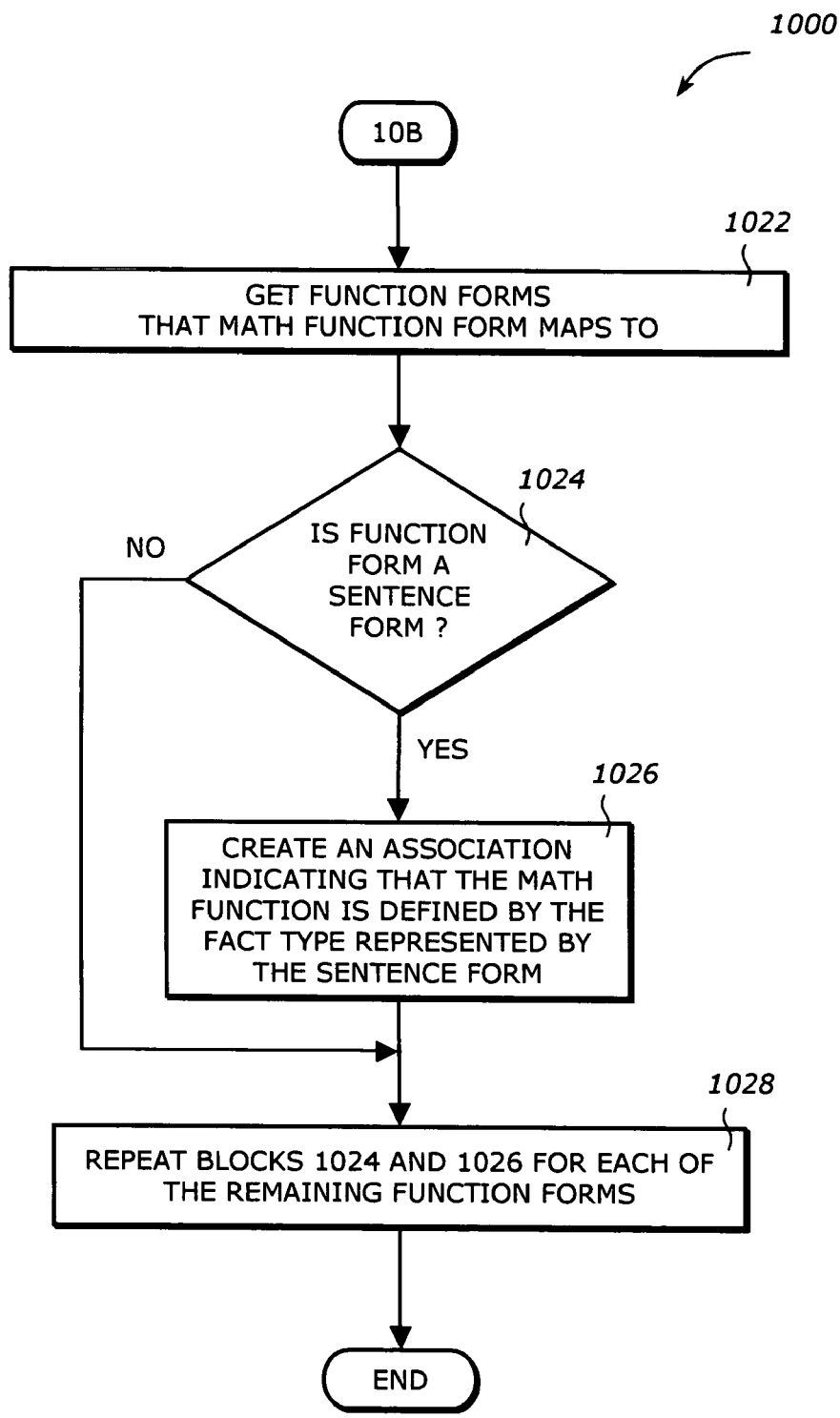

FIGS. 10A and 10B are a flowchart illustrating a process 1000 for processing a mathematical function form included in a package to map the mathematical function form to a fact type via an association with a mathematical function. Process 1000 is called by block 310 (FIG. 3).

Upon Start, process 1000 checks whether the mathematical function form is already mapped to a mathematical function (block 1002). If it is, process 1000 terminates. Otherwise, process 1000 initializes a working set (block 1004). Process 1000 gathers the mathematical function form and its synonyms from each of the packages as mathematical function forms in a working set (block 1006). Process 1000 computes the logical identity of the mathematical function form (block 1008, see FIG. 9). Process 1000 checks whether the computed identity maps to a mathematical function (block 1010). If it is, process 1000 gets the mapped mathematical function (block 1012) then continues to block 1016. Otherwise, process 1000 creates a mathematical function (block 1014) then proceeds to block 1016. Process 1000 maps each of the mathematical function forms in the working set as representer of the mathematical function (block 1016). Process 1000 processes placeholders of each of the mathematical function forms in the working set (block 1018). Process 1000 adds each pair formed by the mathematical function and a mathematical function form in the working set to the object table (block 1020). Note that block 1020 is an optional implementation detail, similar to block 412 in FIG. 4 discussed above. Next, process 1000 obtains all the function forms to which the mathematical function maps (block 1022). Process 1000 checks whether one of the obtained function forms is a sentence form (block 1024). If it is not, process 1000 goes to block 1028. If it is, process 1000 creates an association indicating that the mathematical function is defined by the fact type that this sentence form represents (block 1026). Process 1000 then repeats from block 1024 onward for each of the remaining obtained function forms (block 1028). After all the obtained function forms are processed, process 1000 terminates.

Figure 11A:
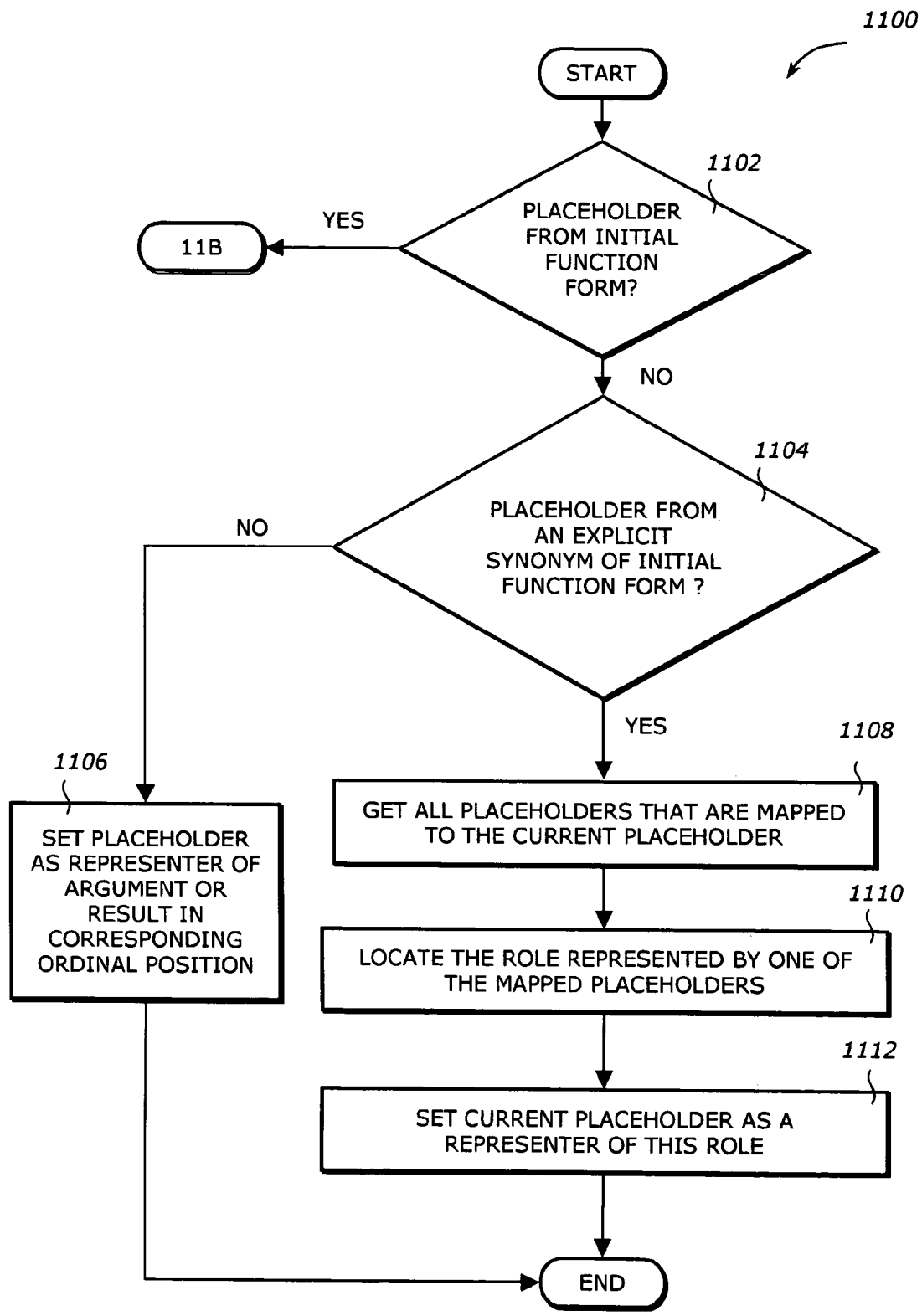
FIGS. 11A and 11B are a flowchart illustrating a process 1100 for processing a placeholder of a mathematical function form or of a nominal restrictive form.
Figure 11B:
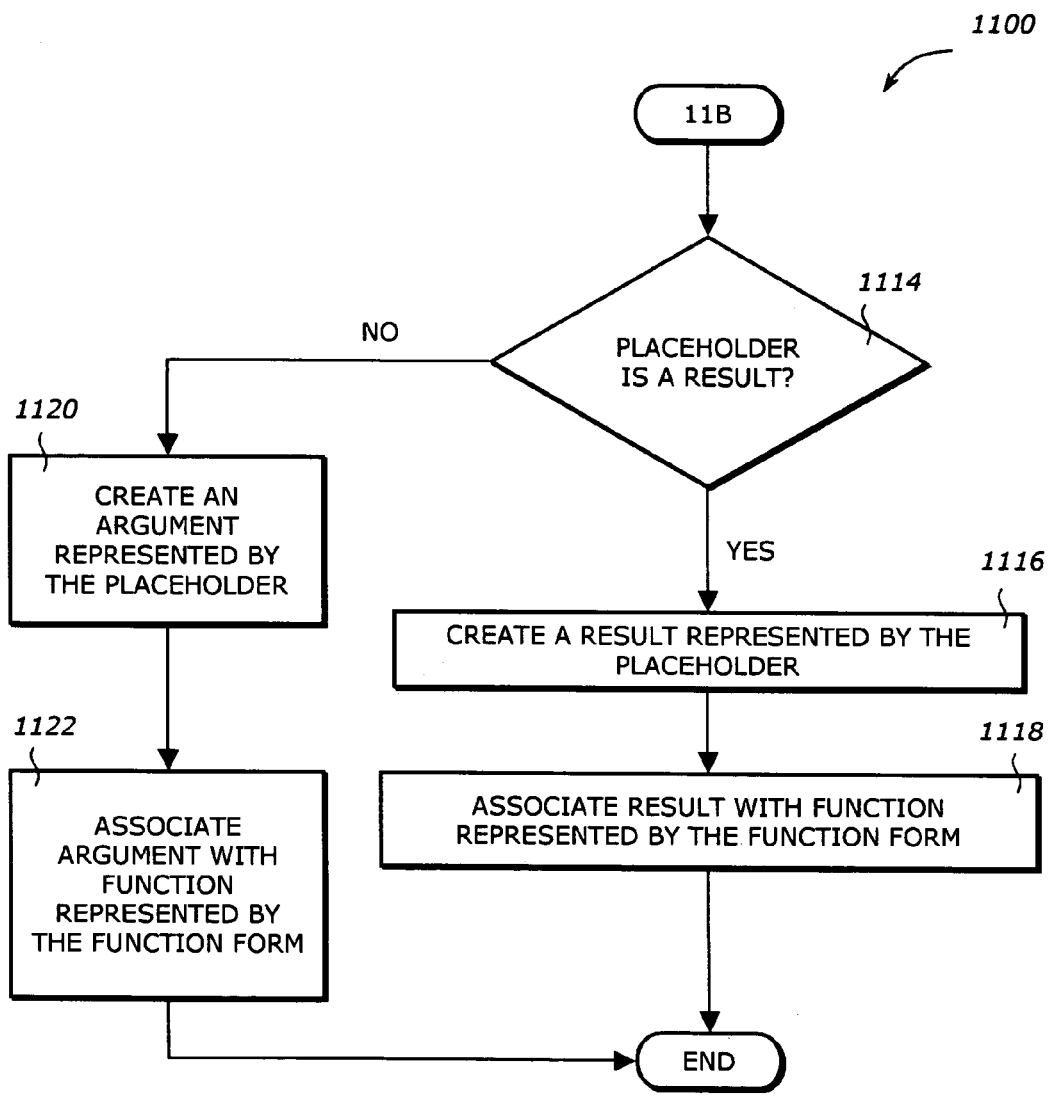

FIGS. 11A and 11B are a flowchart illustrating a process 1100 for processing a placeholder of a mathematical function form or of a nominal restrictive form. Process 1100 is called by block 1018 (FIG. 10A) for processing a placeholder of a mathematical function form, or by block 1218 (FIG. 12A) for processing a placeholder of a nominal restrictive form.

Upon Start, process 1100 checks whether the placeholder is from the initial function form (block 1102). If it is, process 1100 goes to block 1114. Otherwise, process 1100 checks whether the placeholder is from an explicit synonym of the initial function form (block 1104). If it is not, process 1100 sets the placeholder as a representer of the argument or result in the corresponding ordinal position (block 1106) then terminates. Note that the argument or result is created in an earlier execution of process 1100 when a placeholder in the initial function form is processed. If the placeholder is from an explicit synonym of the initial function form, process 1100 gets all placeholders that are mapped to the current placeholder (block 1108). Process 1100 locates the role represented by one of these mapped placeholders (block 1110). Process 1100 sets the current placeholder as a representer of this role (block 1112), then terminates. At block 1114, that is, in the case where the placeholder is from the initial function form, process 1100 checks whether the placeholder is a result. If it is a result, process 1100 creates a result represented by the placeholder (block 1116), creates an association between the result and the function represented by the function form (block 1118), then process 1100 terminates. Otherwise, process 1100 creates an argument represented by the placeholder (block 1120), creates an association between the argument and the function represented by the function form (block 1122), then process 1100 terminates. Note that, since a mathematical function form does not have a placeholder that is a result, the answer to the inquiry in block 1114 for a placeholder of mathematical function form is always NO.

Figure 12A:
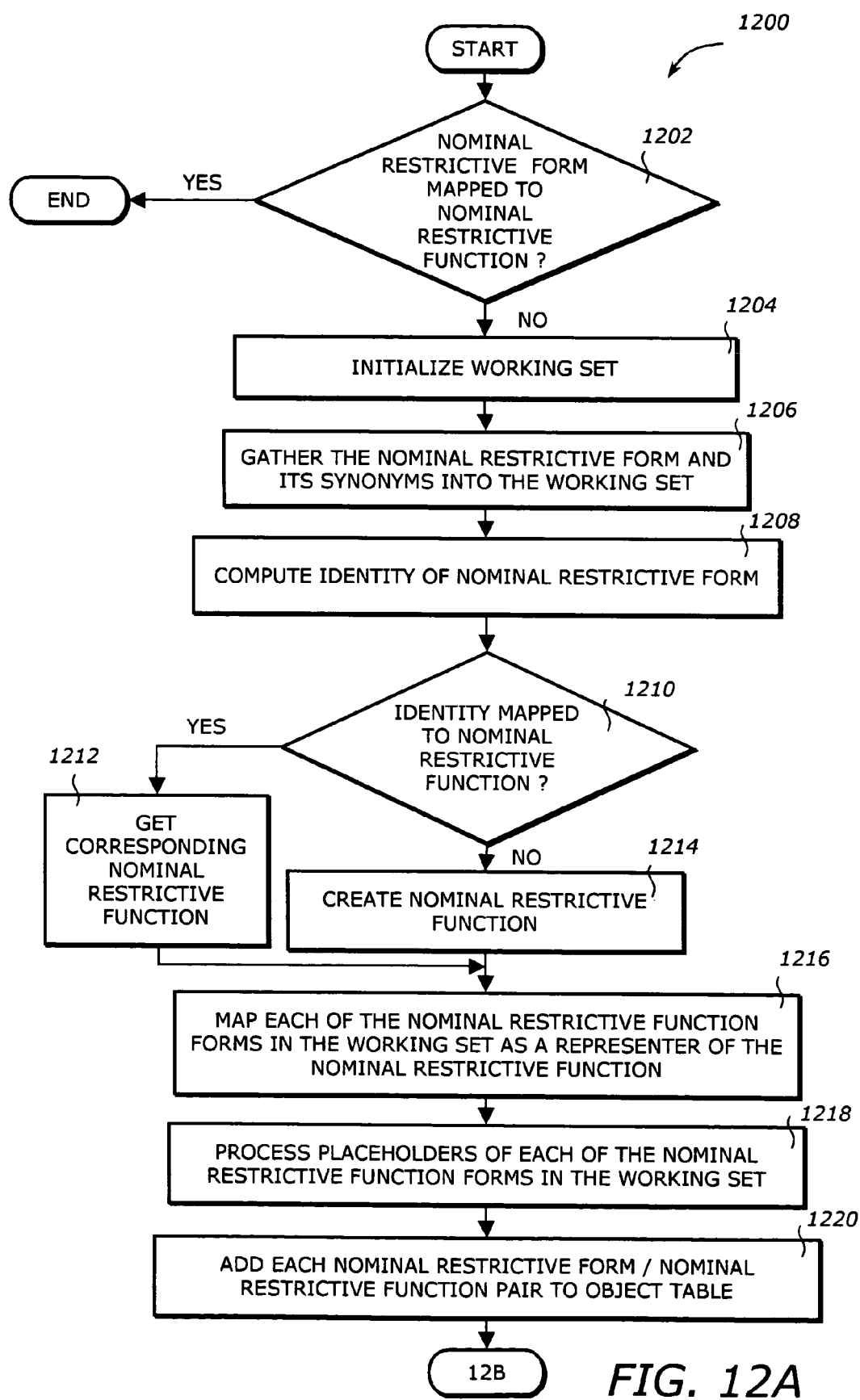
FIGS. 12A and 12B are a flowchart illustrating a process 1200 for processing a nominal restrictive form included in a package to map the nominal restrictive form to a fact type via an association with a nominal restrictive function.
Figure 12B:
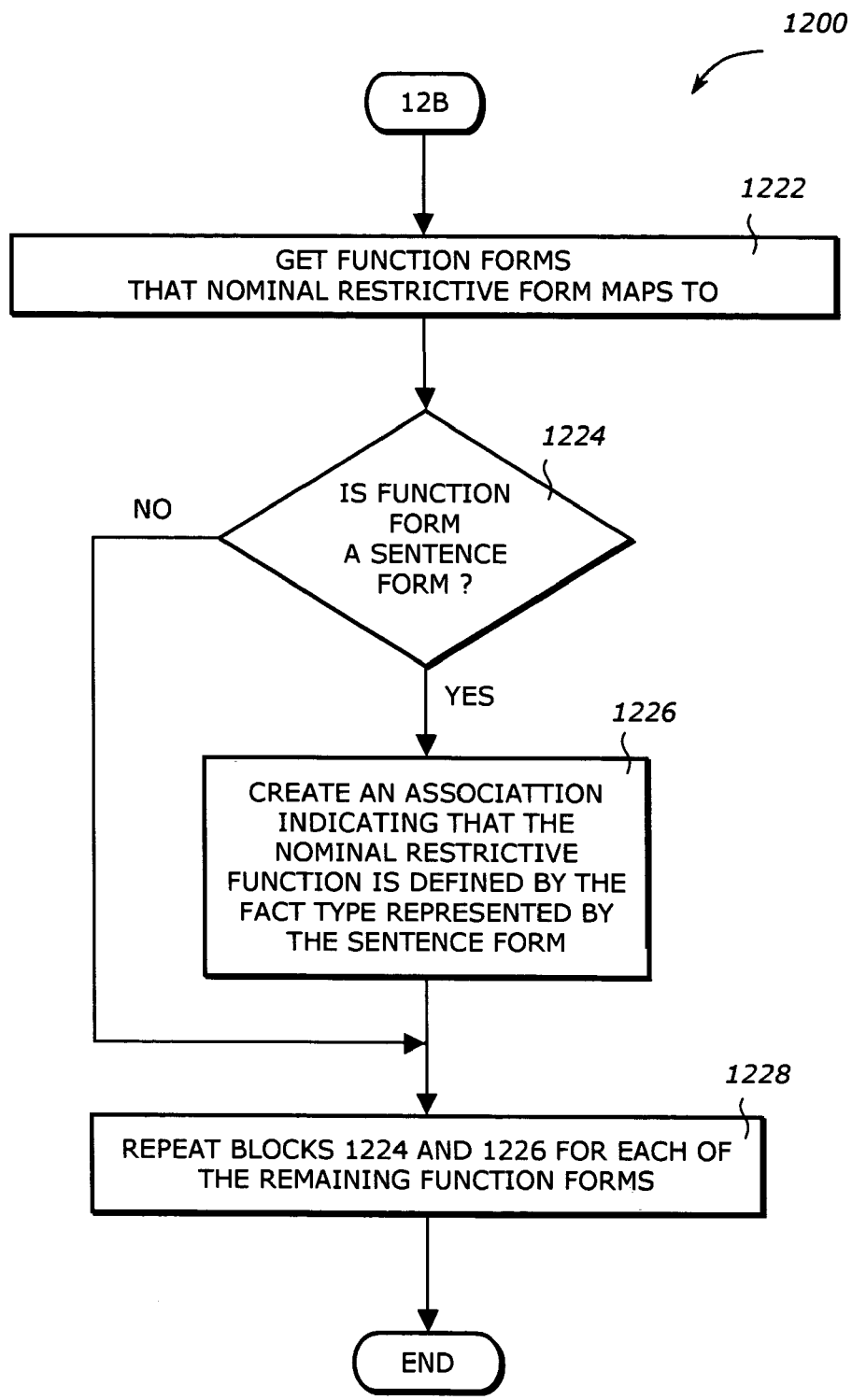

FIGS. 12A and 12B are a flowchart illustrating a process 1200 for processing a nominal restrictive form included in a package to map the nominal restrictive form to a fact type via an association with a nominal restrictive function. Process 1200 is called by block 312 (FIG. 3).

Upon Start, process 1200 checks whether the nominal restrictive form is already mapped to a nominal restrictive function (block 1202). If it is, process 1200 terminates. Otherwise, process 1200 initializes a working set (block 1204). Process 1200 gathers the nominal restrictive form and its synonyms from each of the packages as nominal restrictive forms in a working set (block 1206). Process 1200 computes the logical identity of the mathematical function form (block 1208, see FIG. 9). Process 1200 checks whether the computed identity maps to a nominal restrictive function (block 1210). If it is, process 1212 gets the mapped mathematical function (block 1212) then continues to block 1216. Otherwise, process 1200 creates a nominal restrictive function (block 1214). Process 1200 maps each of the nominal restrictive forms in the working set as representation of the nominal restrictive function (block 1216). Process 1200 processes placeholders of each of the mathematical function forms in the working set (block 1218). Process 1200 adds each pair formed by the nominal restrictive function and a nominal restrictive form in the working set to the object table (block 1220). Note that block 1220 is an optional implementation detail, similar to block 412 in FIG. 4 discussed above. Next, process 1200 obtains all the function forms to which the nominal restrictive function maps (block 1222). Process 1200 checks whether one of the obtained function forms is a sentence form (block 1224). If it is not, process 1200 goes to block 1228. If it is, process 1200 creates an association indicating that the nominal restrictive function is defined by the fact type that this sentence form represents (block 1226). Process 1200 then repeats from block 1224 onward for each of the remaining obtained function forms (block 1228). After all the remaining obtained function forms are processed, process 1200 terminates.

Figure 13:
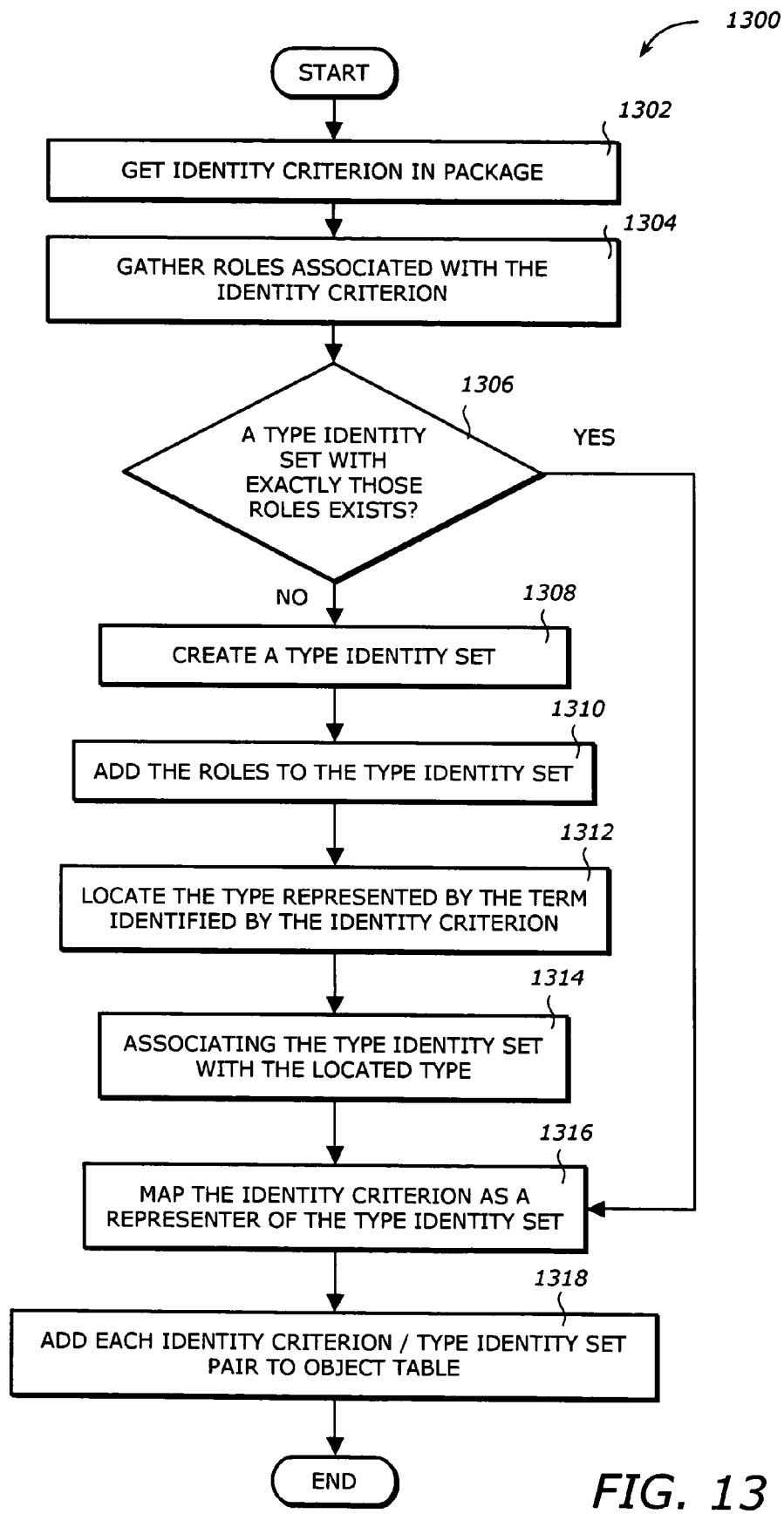
FIG. 13 is a flowchart of a process 1300 for processing an identity criterion included in a package.

FIG. 13 is a flowchart of a process 1300 for processing an identity criterion included in a package. Process 1300 is called by block 314 (FIG. 3). Upon Start, process 1300 gets the identity criterion passed by the calling block 314 (block 1302). Process 1300 gathers roles associated with the identity criterion (block 1304). Process 1300 checks whether a type identity set with exactly those roles exists (block 1306). If it exists, process 1300 continues at block 1316. Otherwise, process 1300 creates a type identity set (block 1308). Process 1300 adds the roles to the type identity set (block 1310). Process 1300 locates the type represented by the term identified by the identity criterion (block 1312). Process 1300 creates an association between the type and the type identity set, indicating that the type has identity from the type identity set (block 1314). Process 1300 maps the identity criterion as a representer of the type identity set (block 1316). Process 1300 adds the pair of identity criterion and the type identity set to the object table (block 1318), then terminates. Note that block 1318 is an optional implementation detail, similar to block 412 in FIG. 4 discussed above.

Figure 14:
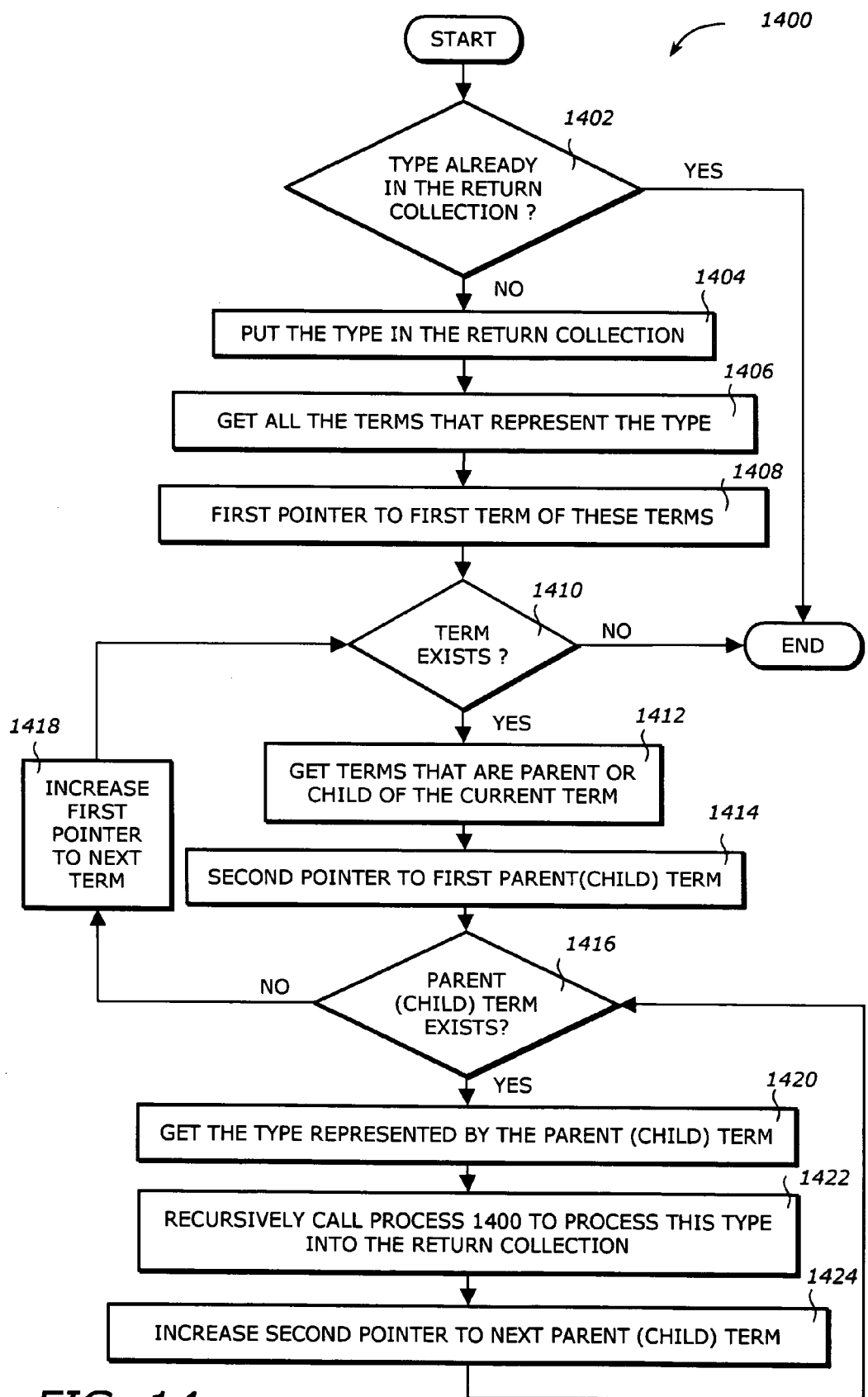
FIG. 14 is a flowchart of a process 1400 for deriving generalizations and specializations of a type.

FIG. 14 is a flowchart of a process 1400 for deriving generalizations and specializations of a type. For a given type, block 316 (FIG. 3) initializes a return collection then calls process 1400 to derive from the type all the types that are its generalizations or specializations and return the generalizations or specializations of the type in the return collection.

Upon Start, process 1400 checks whether the type is already in the return collection (block 1402). If it is, process 1400 terminates. Otherwise, process 1400 puts the type in the return collection (block 1404). Process 1400 gets all the terms that represent the type (block 1406). Process 1400 sets a first pointer to the first of these terms (block 1408). Process 1400 checks whether the term exists (block 1410). If it does not exist, process 1400 terminates. Otherwise, process 1400 gets all the terms that are defined as a parent or a child of the current term (block 1412). Process 1400 sets a second pointer to the first of these parent (or child) terms (block 1414). Process 1400 checks whether this parent (or child) term exists (block 1416). If it does not exist, process 1400 increase the first pointer to the next term in the group of terms that represent the type (block 1418). Otherwise, process 1400 gets the type that is represented by the parent (child) term (block 1420). Process 1400 recursively calls itself to process this type and its generalizations and specializations into the return collection (block 1422). After all the recursive calls end, process 1400 increases second pointer to the next parent (child) term (block 1424), then continues at block 1416 as described above.

Figure 15:
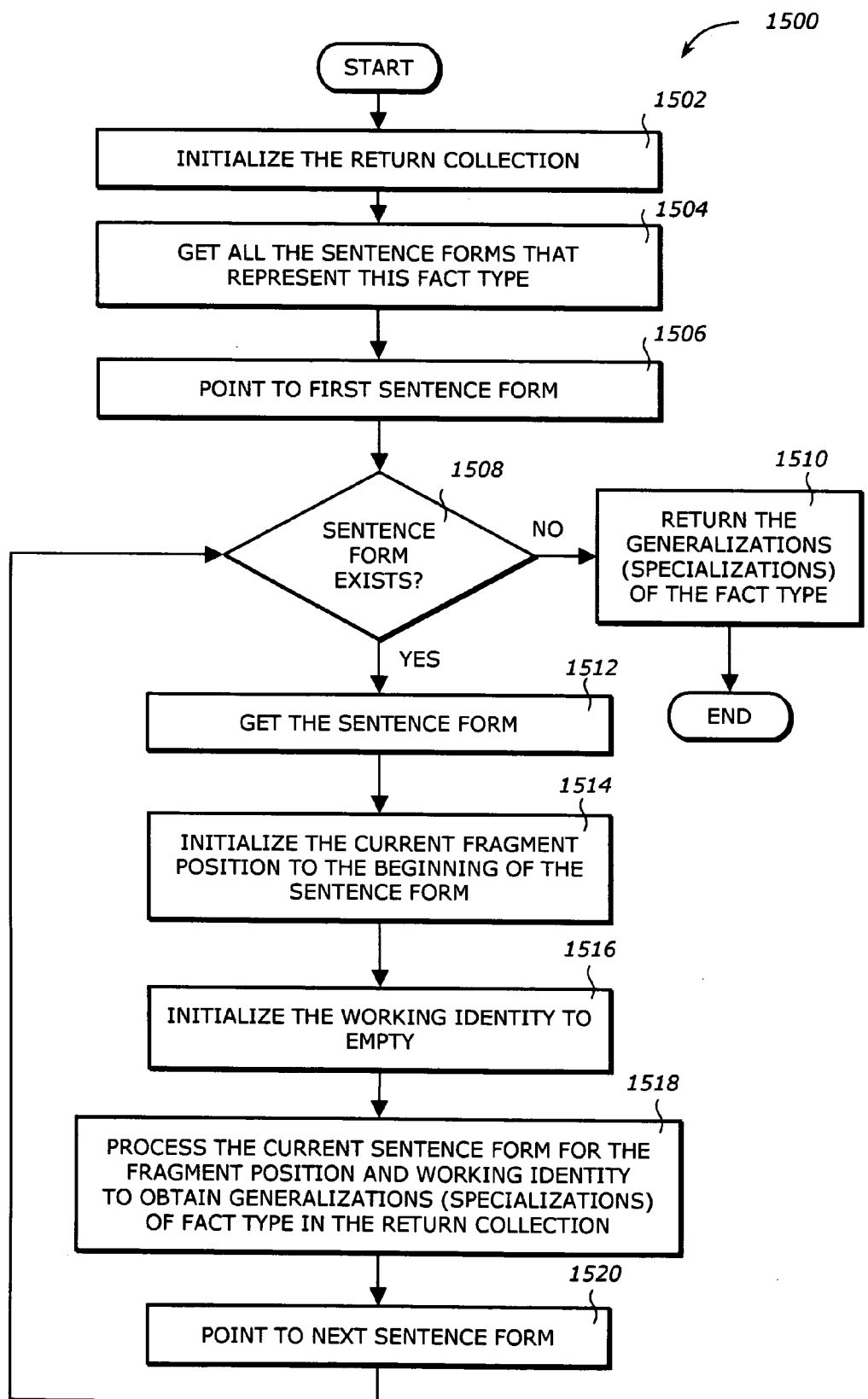
FIG. 15 is a flowchart of a process 1500 for deriving generalizations and specializations of a fact type.

FIG. 15 is a flowchart of a process 1500 for deriving generalizations and specializations of a fact type. Block 318 (FIG. 3) calls process 1500 for a given fact type.

Upon Start, process 1500 initializes the return collection (block 1502). Process 1500 gets all the sentence forms that represent this fact type (block 1504). Process 1500 sets a pointer to the first of these sentence forms (block 1506). Process 1500 checks whether the sentence form exists (block 1508). If it does not exist, process 1500 returns the generalizations and specializations of the fact type that are collected in the return collection (block 1510) then terminates. Otherwise, process 1500 gets the sentence form (block 1512). Process 1500 initializes the current fragment position to the beginning of the sentence form (block 1514). Process 1500 initializes the working identity to empty (block 1516). Process 1500 then processes the current sentence form for the fragment position and working identity to obtain generalizations and specializations of the fact type represented by the current sentence form in the return collection (block 1518). An embodiment of this block 1518 is described later, in conjunction with FIGS. 16A, 16B and 16C. Process 1500 then sets pointer to the next sentence form in the set of sentence forms that represent this fact type (block 1520), then continues at block 1508 as described above.

Figure 16A:
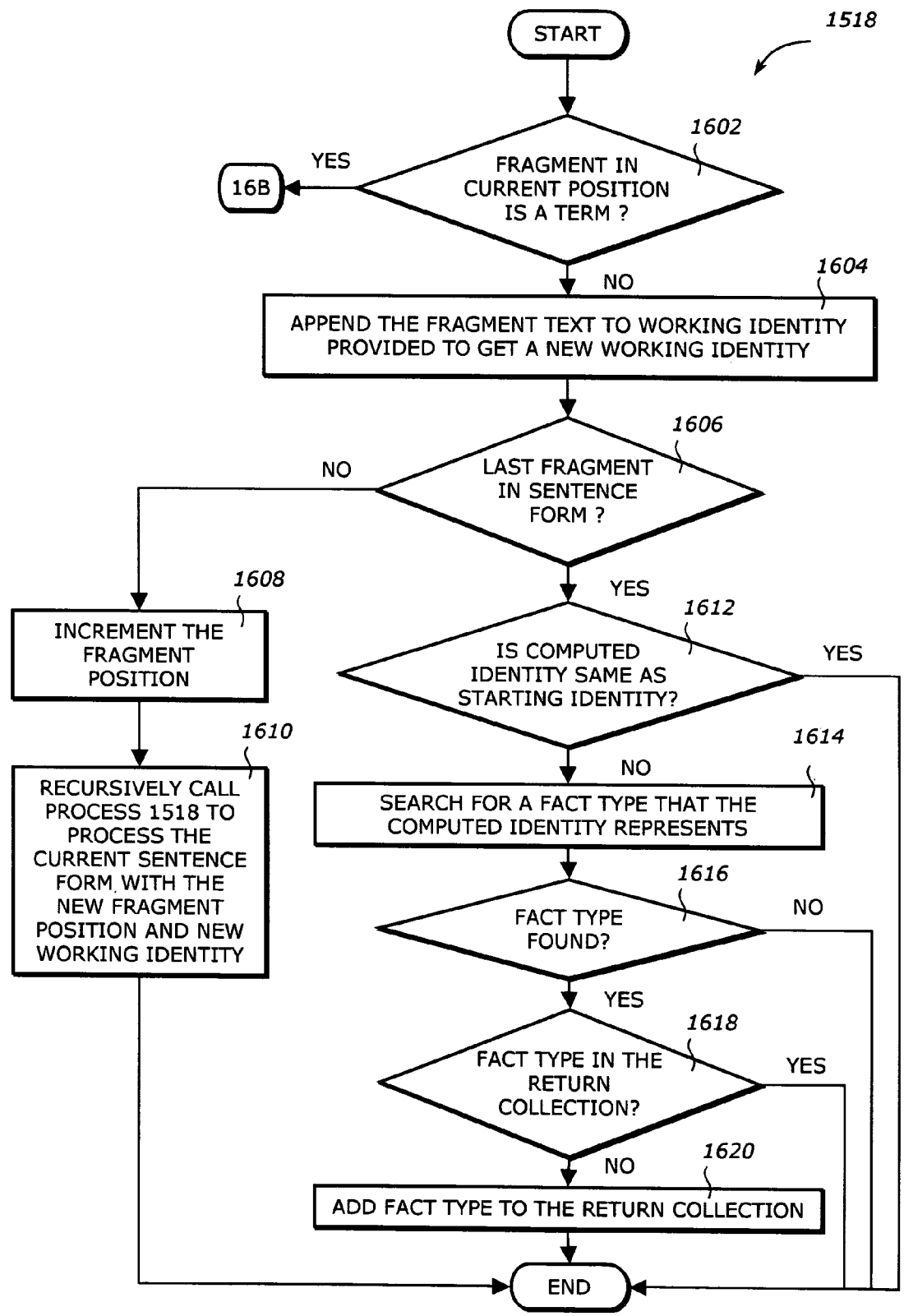
FIGS. 16A, 16B, and 16C are a flowchart of an embodiment of block 1518 of process 1500 (FIG. 15) for processing a current sentence form to derive generalizations and specializations of a fact type represented by the current sentence form.
Figure 16B:
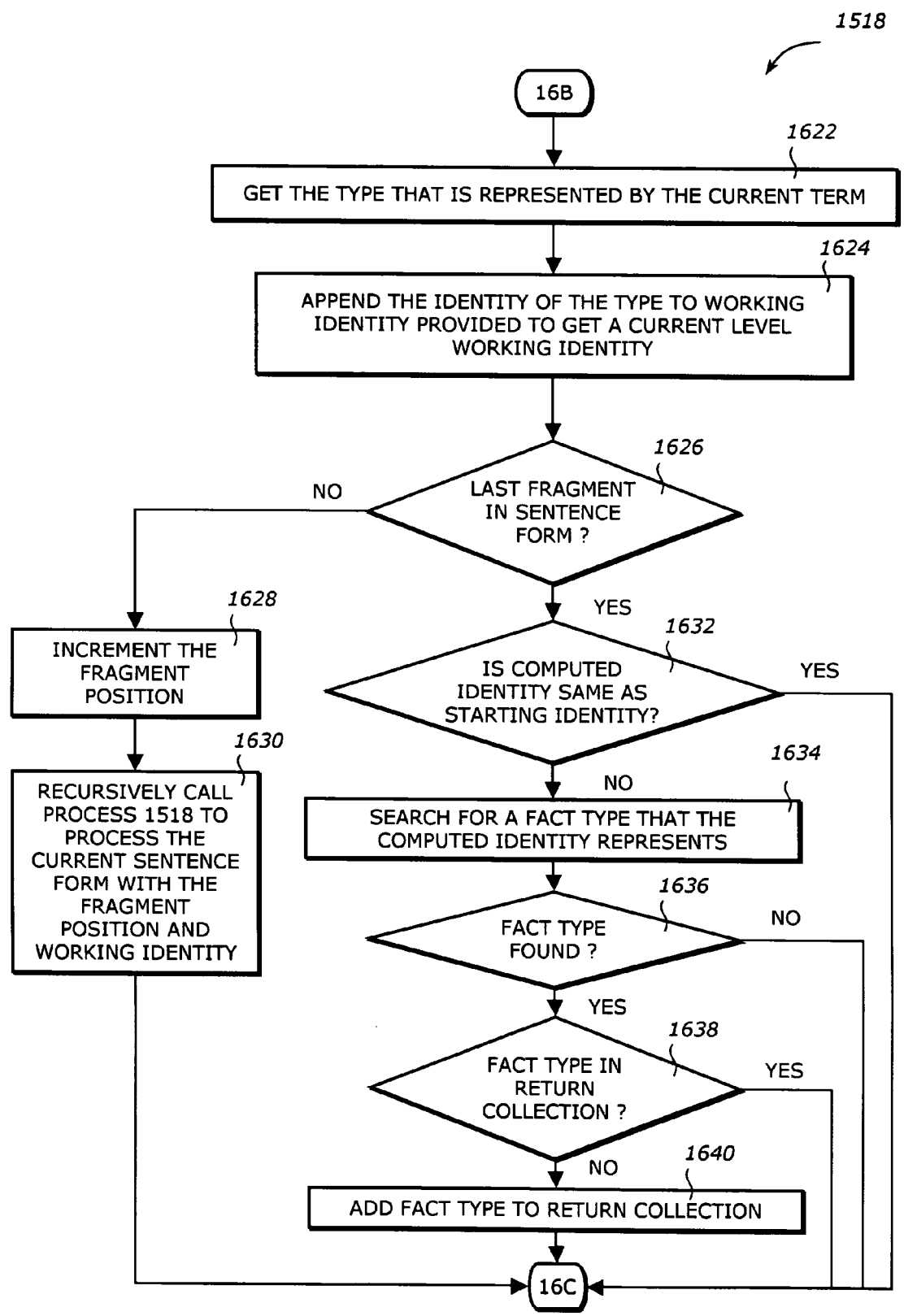
Figure 16C:
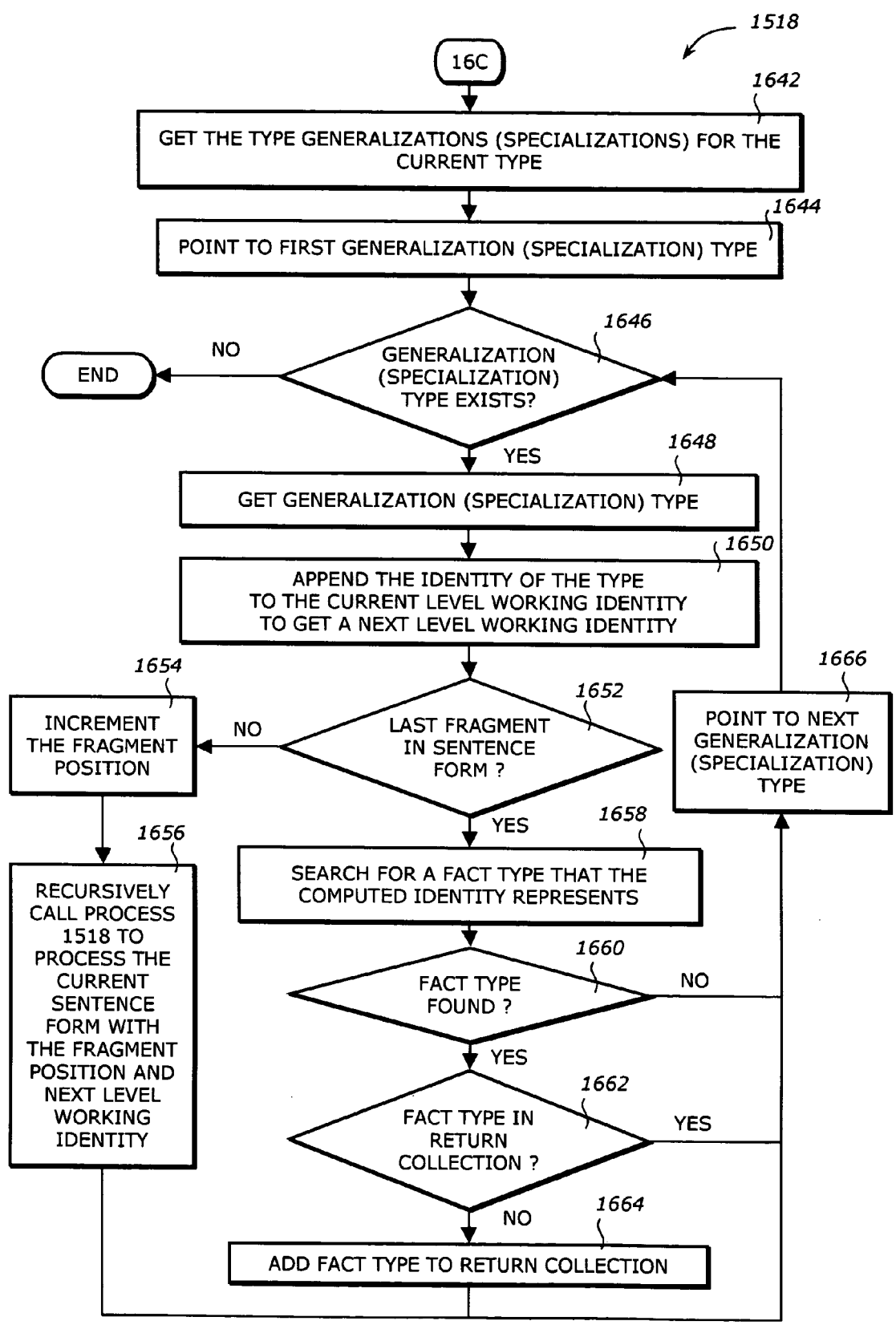

FIGS. 16A, 16B, and 16C are a flowchart of an embodiment of block 1518 of process 1500 (FIG. 15) for processing a current sentence form to derive generalizations and specializations of a fact type represented by the current sentence form.

Upon Start, process 1518 checks whether the fragment in the current fragment position is a term (block 1602). If it is a term, process 1518 continues at block 1622 (FIG. 16B). If it is not a term, process 1518 appends the text of the fragment to the working identity provided to get a new (that is, next level) working identity (block 1604). Process 1518 checks whether the fragment is the last fragment in the sentence form (block 1606). If it is not, process 1518 increments the fragment position (block 1608), then process 1518 recursively calls itself to process the current sentence form with the new fragment position and working identity (block 1610). If the fragment is the last fragment in the sentence form, process 1518 checks whether the computed identity is the same as the starting identity (block 1612). If it is, process 1518 terminates. Otherwise, process 1518 seeks a fact type represented by the computed identity (block 1614). Process 1518 checks whether the fact type is found (block 1616). If the fact type is not found, process 1518 terminates. Otherwise, process 1518 checks whether the found fact type is already in the return collection (block 1618). If it is already in the return collection, process 1518 terminates. Otherwise, process 1518 adds the found fact type to the return collection (block 1620), then terminates.

If the fragment in the current fragment position is a term, process 1518 gets the type that is represented by the term (block 1622, FIG. 16B). Process 1518 appends the identity of the type to the working identity provided to obtain a current level working identity (block 1624). Process 1518 checks whether the fragment is the last fragment in the sentence form (block 1626). If it is not, process 1518 increments the fragment position (block 1628), then process 1518 recursively calls itself to process the current sentence form with the new fragment position and working identity (block 1630). After all the recursive calls end, process 1518 continues at block 1642 (FIG. 16C).

If the fragment is the last fragment in the sentence form, process 1518 checks whether the computed identity of the sentence form is the same as the starting identity (block 1632). If it is the same, process 1518 continues at block 1642 (FIG. 16C). Otherwise, process 1518 searches for a fact type that the computed identity represents (block 1634). Process 1518 checks whether such fact type is found (block 1636). If the fact type is not found, process 1518 continues at block 1642 (FIG. 16C). Otherwise, process 1518 checks whether the found fact type is already in the return collection (block 1638). If it is, process 1518 continues at block 1642. Otherwise, process 1518 adds the found fact type to the return collection (block 1640), then continues at block 1642 (FIG. 16C).

Referring to FIG. 16C, process 1518 gets the type generalizations (and/or specializations) for the current type (block 1642). Process 1518 sets pointer to the first of these generalization (specialization) types (block 1644). Process 1518 checks whether the generalization (specialization) type exists (block 1646). If it does not, process 1518 terminates. Otherwise, process 1518 gets this generalization (specialization) type (block 1648). Process 1518 then appends the identity of this type to the current-level working identity to obtain a next-level working identity (block 1650). Process 1518 checks whether the fragment is the last fragment in the sentence form (block 1652). If it is not the last fragment, process 1518 increments the fragment position (block 1654), recursively calls itself to process the current sentence form for the fragment position and next-level working identity (block 1656), then continues at block 1666 after all the recursive calls end.

If the fragment is the last fragment in the sentence form, process 1518 searches for a fact type that the computed identity of the sentence form represents (block 1658). Process 1518 checks whether such fact type is found (block 1660). If it is not found, process 1518 continues at block 1666. If the fact type is found, process 1518 checks whether the found fact type is already in the return collection (block 1662). If it is, process 1518 continues at block 1666. Otherwise, process 1518 adds the found fact type to the return collection then continues at block 1666.

At block 1666, process 1518 sets the pointer to the next type in the set of generalization (specialization) types obtained in block 1642 (block 1666), then continues at block 1646 as described previously.

Once the logical model of business types and fact types has been created from a business vocabulary, expressions in the linguistic model, such as expressions of business rules, are translated to logical formulations (block 320 of FIG. 3). Expressions are represented in the linguistic model as compositions of references to logical operations and to symbols such as names, terms and function forms and their placeholders. The generation of a logical formulation from an expression is a straightforward transformation in which the following substitutions are made: (1) each name is replaced by the modeled instance that it represents; (2) each term is replaced by the type that it represents; (3) each function form is replaced by the fact type that it represents; (4) each placeholder used with a function form is replaced by the one role that it either represents directly or maps to indirectly by way of representing an argument or result; and (5) each identity criterion is replaced by the type identity set that it represents.

Figure 17:
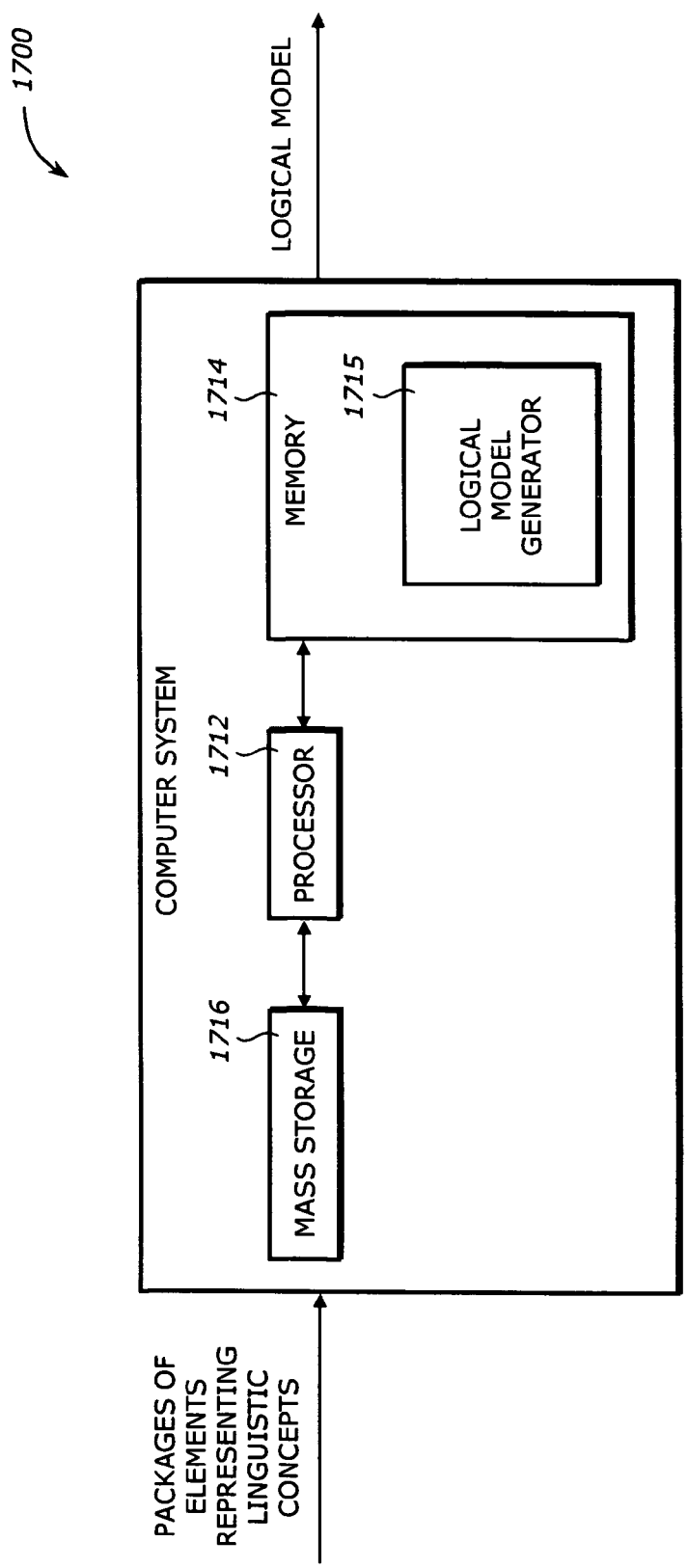
FIG. 17 is a block diagram illustrating a computer system in which one embodiment of the invention can be practiced.

FIG. 17 is a block diagram illustrating a computer system 1700 in which one embodiment of the invention can be practiced.

The computer system 1700 includes a processor 1712, a memory 1714, and a mass storage device 1716. The computer system 1700 receives a stream of input representing a set of information packages containing elements representing linguistic concepts, processes the elements included in the packages in accordance to the method of the present invention, and outputs a logical model of objects.

The processor 1712 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The memory 1714 stores system code and data. The memory 1714 is typically implemented with dynamic random access memory (DRAM) or static random access memory (SRAM). The system memory may include program code or code segments implementing one embodiment of the invention. The memory 1714 includes a logical model generator module 1715 of the present invention when loaded from the mass storage 1716. The logical model generator module 1715 implements all or part of the logical model generator 130 shown in FIG. 1. The logical model generator module 1715 may also simulate the logical model generator functions described herein. The logical model generator module 1715 contains instructions that, when executed by the processor 1712, cause the processor to perform the tasks or operations as described above.

The mass storage device 1716 stores archive information such as code, programs, files, data, databases, applications, and operating systems. The mass storage device 1716 may include compact disk (CD) ROM, a digital video/versatile disc (DVD), floppy drive, and hard drive, and any other magnetic or optic storage devices such as tape drive, tape library, redundant arrays of inexpensive disks (RAIDs), etc. The mass storage device 1716 provides a mechanism to read machine-accessible media. The machine-accessible media may contain computer readable program code to perform tasks as described above.

Elements of an embodiment of the invention may be implemented by hardware, firmware, software or any combination thereof. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" herein refers to any type of information that is encoded for machine-readable purposes. Therefore, it may include program, code, data, file, etc.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method, within a computing system comprising at least one computer processor and at least one computer readable memory, of generating a logical model of objects from elements representing rule specifications, the method comprising:

receiving packages of elements representing rule specifications expressed with linguistic concepts, the packages comprising at least one of: terms, names, sentence forms, mathematical function forms, nominal restrictive forms, identity criteria, and expressions; and processing the packages to generate a logical model of objects representing the semantics of each rule in terms of formal logic, wherein processing the packages comprises:

processing the terms included in the packages to associate each of the terms with a type;

processing the names included in the packages to map each of the names to a type, each of the names corresponding to a term of the processed terms;

processing the sentence forms included in the packages to associate each of the sentence forms with a fact type;

processing the mathematical function forms included in the packages to map each of the mathematical function forms to a fact type;

processing the nominal restrictive forms included in the packages to map each of the nominal restrictive forms to a fact type;
processing the identity criteria included in the packages to map each of the identity criteria to a type;
deriving type specializations and generalizations for at least one of the types;
deriving fact type specializations and generalizations for at least one of the fact types; and
processing the expressions included in the packages to generate logical formulations, the expressions including at least one of a name, a term, a function form having at least a placeholder, and an identity criterion.

2. The method of claim 1 wherein processing the terms included in the packages comprises:
determining whether a first term of the terms is already mapped to a type; and
if the first term is not already mapped to a type:
gathering the first term and synonyms of the first term from each of the packages as terms in a working set;
creating a type; and
mapping each of the terms in the working set as a representer of the type.

3. The method of claim 1 wherein processing the names included in the packages comprises:
determining whether a first name of the names is already mapped to a modeled instance; and
if the first name is not already mapped to a modeled instance:
gathering the first name and synonyms including explicit synonyms of the first name from each of the packages as second names in a working set;
creating a modeled instance;
mapping each of the second names in the working set as a representer of the modeled instance, the second names in the working set corresponding to one of the processed terms, the one term being associated with a type; and
creating an association between the modeled instance and the type.

4. The method of claim 1 wherein processing the sentence forms included in the packages comprises:
if the first sentence form is not mapped to a fact type:
gathering the first sentence form and synonyms including explicit synonyms of the first sentence form from each of the packages as sentence forms in a working set;
computing an identity of the first sentence form;
if the identity maps to a fact type,
obtaining the fact type to which the identity maps;
else creating a fact type;
mapping each of the sentence forms in the working set as a representer of the fact type; and
processing placeholders of each of the sentence forms in the working set.

5. The method of claim 4 wherein processing placeholders of each of the sentence forms in the working set comprises:
if the first placeholder is from the first sentence form:
creating a role defined by the first placeholder; and
creating an association relating the role to the fact type of the first sentence form, else
if the first placeholder is not from one of the explicit synonyms of the first sentence form:
setting the first placeholder as a representer of role in corresponding ordinal position;
else
obtaining all placeholders that are mapped to the first placeholder, one of the mapped placeholders representing a role;
locating the represented role; and
setting the first placeholder as a representer of the located role.

6. The method of claim 1 wherein processing the mathematical function forms included in the packages comprises:
if the first sentence form is not mapped to a mathematical function:
gathering the first mathematical function form and synonyms including explicit synonyms of the first mathematical function form from each of the packages as mathematical function forms in a working set;
computing identity of the first mathematical function form;
if the identity maps to a mathematical function,
obtaining the mathematical function to which the identity maps;
else creating a mathematical function;
mapping each of the mathematical function forms in the working set as a representer of the mathematical function; and
processing placeholders of each of the mathematical function forms in the working set;
obtaining function forms to which the mathematical function maps; and
if one of the function forms is a sentence form representing a fact type:
creating an association indicating that the mathematical function is defined by the fact type represented by the sentence form.

7. The method of claim 6 wherein processing placeholders of each of the mathematical function forms in the working set comprises:
if the first placeholder is from the first mathematical function form:
creating an argument represented by the first placeholder, and
creating an association relating the argument to the mathematical function to which the first mathematical function form maps;
else
if the first placeholder is not from one of the explicit synonyms of the first mathematical function form:
setting the first placeholder as a representer of a previously created argument in corresponding ordinal position;
else
obtaining all placeholders that are mapped to the first placeholder, one of the mapped placeholders representing a role;
locating the represented role; and
setting the first placeholder as a representer of the located role.

8. The method of claim 1 wherein processing the nominal restrictive forms included in the packages comprises:
if the first nominal restrictive form is not mapped to a nominal restrictive function:
gathering the first nominal restrictive function form and synonyms including explicit synonyms of the first nominal restrictive function form from each of the packages as nominal restrictive function forms in a working set;
computing identity of the first nominal restrictive function form;
if the identity maps to a nominal restrictive function,
obtaining the nominal restrictive function to which the identity maps;
else creating a nominal restrictive function;
mapping each of the nominal restrictive function forms in the working set as a representer of the nominal restrictive function; and processing placeholders of each of the nominal restrictive function forms in the working set; and obtaining function forms to which the nominal restrictive function maps;

if one of the function forms is a sentence form representing a fact type:

creating an association indicating that the nominal restrictive function is defined by the fact type represented by the sentence form.

9. The method of claim 8 wherein processing placeholders of each of the nominal restrictive function forms in the working set comprises:

if the first placeholder is from the first nominal restrictive function form:

if the first placeholder is a result:

creating a result represented by the first placeholder, and creating an association relating the result to the nominal restrictive function to which the first nominal restrictive form maps;

else creating an argument represented by the first placeholder, and creating an association relating the argument to the nominal restrictive function to which the first nominal restrictive form maps;

else if the first placeholder is not from one of the explicit synonyms of the first nominal restrictive form:

setting the first placeholder as a representer of argument or result in corresponding ordinal position;

else obtaining all placeholders that are mapped to the first placeholder, one of the mapped placeholders representing a role;

locating the represented role; and setting the first placeholder as a representer of the located role.

10. The method of claim 1 wherein processing the identity criteria included in the packages comprises:

gathering roles associated with an identity criterion included in a package, the identity criterion identifying a term;

determining whether an identity set associated with the gathered roles already exists;

if a type identity set associated with the gathered roles does not already exist:

creating a type identity set;

associating the gathered roles with the type identity set;

locating the type defined by the identified term;

creating an association relating the type identity set to the located type; and setting the identity criterion as a representer of the type identity set;

else setting the identity criterion as a representer of the type identity set.

11. The method of claim 1 wherein deriving specializations and generalizations for at least one of the types comprises:

obtaining a first term that represents a first type from one of the packages;

obtaining terms that are defined as a parent or child of the first term; and for each of the parent or child terms of the first term, obtaining the type associated with the parent or child term.

12. The method of claim 1 wherein deriving specializations and generalizations for at least one of the fact types comprises:

obtaining a sentence form that represents a first fact type from one of the packages, the sentence form comprising fragments, the fragments including terms and connectors, each of the terms being associated with a type, each of the types having an identity string;

processing the fragments to produce a computed string, the computed string including at least one of the identity strings and one of the connectors;

searching for a fact type corresponding to the computed string;

if the fact type is found, returning the fact type as a generalization or specialization of the first fact type.

13. The method of claim 1 wherein processing the expressions included in the packages to generate logical formulations comprises:

replacing the name by a modeled instance that the name represents;

replacing the term by the type that the term represents;

replacing the function form by the fact type that the function form represents;

replacing the placeholder by the role that the placeholder either represents directly or maps to indirectly by representing an argument or a result; and replacing the identity criterion by the type identity set that the identity criterion represents.

14. An article of manufacture comprising:

a machine-accessible medium including data that, when accessed by a machine, causes the machine to perform operations comprising the method of claim 1.

15. The article of manufacture of claim 14 wherein the data causing the machine to perform the operation of processing the terms included in the packages to associate each of the terms with a type comprises data that, when accessed by the machine, causes the machine to perform operations comprising:

determining whether a first term of the terms is already mapped to a type; and if the first term is not already mapped to a type:

gathering the first term and explicit and implicit synonyms of the first term from each of the packages as terms in a working set;

creating a type; and mapping each of the terms in the working set as a representer of the type.

16. The article of manufacture of claim 14 wherein the data causing the machine to perform the operation of processing the names included in the packages to map each of the names to a type comprises data that, when accessed by the machine, causes the machine to perform operations comprising:

determining whether a first name of the names is already mapped to a modeled instance; and if the first name is not already mapped to a modeled instance:

gathering the first name and synonyms including explicit synonyms of the first name from each of the packages as second names in a working set;

creating a modeled instance;

mapping each of the second names in the working set as a representer of the modeled instance, the second names in the working set corresponding to one of the processed terms, the one term being associated with a type; and creating an association between the modeled instance and the type.

17. The article of manufacture of claim 14 wherein the data causing the machine to perform the operation of processing the sentence forms included in the packages to associate each of the sentence forms with a fact type comprises data that, when accessed by the machine, causes the machine to perform operations comprising:
  if the first sentence form is not mapped to a fact type:
  gathering the first sentence form and synonyms including explicit synonyms of the first sentence form from each of the packages as sentence forms in a working set;
  computing an identity of the first sentence form;
  if the identity maps to a fact type,
  obtaining the fact type to which the identity maps;
  else creating a fact type;
  mapping each of the sentence forms in the working set as a representer of the fact type; and
  processing placeholders of each of the sentence forms in the working set.

18. The article of manufacture of claim 17 wherein the data causing the machine to perform the operation of processing placeholders of each of the sentence forms in the working set comprises data that, when accessed by the machine, causes the machine to perform operations comprising:
  if the first placeholder is from the first sentence form:
    creating a role defined by the first placeholder; and
    creating an association relating the role to the fact type of the first sentence form, else
      if the first placeholder is not from one of the explicit synonyms of the first sentence form:
        setting the first placeholder as a representer of role in corresponding ordinal position;
      else
        obtaining all placeholders that are mapped to the first placeholder, one of the mapped placeholders representing a role;
        locating the represented role; and
        setting the first placeholder as a representer of the located role.

19. The article of manufacture of claim 14 wherein the data causing the machine to perform the operation of processing the mathematical function forms included in the packages to map each of the mathematical function forms to a fact type comprises data that, when accessed by the machine, causes the machine to perform operations comprising:
  if the first sentence form is not mapped to a mathematical function:
  gathering the first mathematical function form and synonyms including explicit synonyms of the first mathematical function form from each of the packages as mathematical function forms in a working set;
  computing identity of the first mathematical function form;
  if the identity maps to a mathematical function,
  obtaining the mathematical function to which the identity maps;
  else creating a mathematical function;
  mapping each of the mathematical function forms in the working set as a representer of the mathematical function; and
  processing placeholders of each of the mathematical function forms in the working set;
  obtaining function forms to which the mathematical function maps; and
  if one of the function forms is a sentence form representing a fact type:
    creating an association indicating that the mathematical function is defined by the fact type represented by the sentence form.

20. The article of manufacture of claim 19 wherein the data causing the machine to perform the operation of processing placeholders of each of the mathematical function forms in the working set comprises data that, when accessed by the machine, causes the machine to perform operations comprising:
  if the first placeholder is from the first mathematical function form:
    creating an argument represented by the first placeholder, and
    creating an association relating the argument to the mathematical function to which the first mathematical function form maps;
  else
    if the first placeholder is not from one of the explicit synonyms of the first mathematical function form:
      setting the first placeholder as a representer of a previously created argument in corresponding ordinal position;
    else
      obtaining all placeholders that are mapped to the first placeholder, one of the mapped placeholders representing a role;
      locating the represented role; and
      setting the first placeholder as a representer of the located role.

21. The article of manufacture of claim 14 wherein the data causing the machine to perform the operation of processing the nominal restrictive forms included in the packages comprises data that, when accessed by the machine, causes the machine to perform operations comprising:
  if the first nominal restrictive form is not mapped to a nominal restrictive function:
  gathering the first nominal restrictive function form and synonyms including explicit synonyms of the first nominal restrictive function form from each of the packages as nominal restrictive function forms in a working set;
  computing identity of the first nominal restrictive function form;
  if the identity maps to a nominal restrictive function,
  obtaining the nominal restrictive function to which the identity maps;
  else creating a nominal restrictive function;
  mapping each of the nominal restrictive function forms in the working set as a representer of the nominal restrictive function; and
  processing placeholders of each of the nominal restrictive function forms in the working set; and
  obtaining function forms to which the nominal restrictive function maps;
  if one of the function forms is a sentence form representing a fact type:
    creating an association indicating that the nominal restrictive function is defined by the fact type represented by the sentence form.

22. The article of manufacture of claim 21 wherein the data causing the machine to perform the operation of processing placeholders of each of the nominal restrictive function forms in the working set comprises data that, when accessed by the machine, causes the machine to perform operations comprising:
  if the first placeholder is from the first nominal restrictive function form:
  if the first placeholder is a result:
    creating a result represented by the first placeholder, and
    creating an association relating the result to the nominal restrictive function to which the first nominal restrictive form maps;

else
creating an argument represented by the first placeholder, and
creating an association relating the argument to the nominal restrictive function to which the first nominal restrictive form maps;
else
if the first placeholder is not from one of the explicit synonyms of the first nominal restrictive form:
setting the first placeholder as a representer of argument or result in corresponding ordinal position;
else
obtaining all placeholders that are mapped to the first placeholder, one of the mapped placeholders representing a role;
locating the represented role; and
setting the first placeholder as a representer of the located role.

23. The article of manufacture of claim 14 wherein the data causing the machine to perform the operation of processing the identity criteria included in the packages comprises data that, when accessed by the machine, causes the machine to perform operations comprising:
gathering roles associated with an identity criterion included in a package, the identity criterion identifying a term;
determining whether an identity set associated with the gathered roles already exists;
if a type identity set associated with the gathered roles does not already exist:
creating a type identity set;
associating the gathered roles with the type identity set;
locating the type defined by the identified term;
creating an association relating the type identity set to the located type; and
setting the identity criterion as a representer of the type identity set;
else
setting the identity criterion as a representer of the type identity set.

24. The article of manufacture of claim 14 wherein the data causing the machine to perform the operation of deriving specializations and generalizations for at least one of the types comprises data that, when accessed by the machine, causes the machine to perform operations comprising:
obtaining a first term that represents a first type from one of the packages;
obtaining terms that are defined as a parent or child of the first term; and
for each of the parent or child terms of the first term, obtaining the type associated with the parent or child term.

25. The article of manufacture of claim 14 wherein the data causing the machine to perform the operation of deriving specializations and generalizations for at least one of the fact types comprises data that, when accessed by the machine, causes the machine to perform operations comprising:
obtaining a sentence form that represents a first fact type from one of the packages, the sentence form comprising fragments, the fragments including terms and connectors, each of the terms being associated with a type, each of the types having an identity string;
processing the fragments to produce a computed string, the computed string including at least one of the identity strings and one of the connectors;
searching for a fact type corresponding to the computed string;
if the fact type is found, returning the fact type as a generalization or specialization of the first fact type.

26. The article of manufacture of claim 14 wherein the data causing the machine to perform the operation of processing the expressions included in the packages to generate logical formulations comprises data that, when accessed by the machine, causes the machine to perform operations comprising:
replacing the name by a modeled instance that the name represents;
replacing the term by the type that the term represents;
replacing the function form by the fact type that the function form represents;
replacing the placeholder by the role that the placeholder either represents directly or maps to indirectly by representing an argument or a result; and
replacing the identity criterion by the type identity set that the identity criterion represents.

27. A system for generating a logical model of objects from elements representing rule specifications, the system comprising:
a processor;
a memory coupled to the processor, the memory containing instructions that, when executed by the processor, cause the processor to perform the method of claim 1.

28. The system of claim 27 wherein the instructions causing the processor to process the terms included in the packages to associate each of the terms with a type comprises instructions that, when executed by the processor, causes the processor to:
determine whether a first term of the terms is already mapped to a type; and
if the first term is not already mapped to a type:
gather the first term and explicit and implicit synonyms of the first term from each of the packages as terms in a working set;
create a type; and
map each of the terms in the working set as a representer of the type.

29. The system of claim 27 wherein the instructions causing the processor to process the names included in the packages to map each of the names to a type comprises instructions that, when executed by the processor, causes the processor to:
determine whether a first name of the names is already mapped to a modeled instance; and
if the first name is not already mapped to a modeled instance:
gather the first name and synonyms including explicit synonyms of the first name from each of the packages as second names in a working set;
create a modeled instance;
map each of the second names in the working set as a representer of the modeled instance, the second names in the working set corresponding to one of the processed terms, the one term being associated with a type; and
create an association between the modeled instance and the type.

30. The system of claim 27 wherein the instructions causing the processor to process the sentence forms included in the packages to associate each of the sentence forms with a fact type comprises instructions that, when executed by the processor, causes the processor to:
if the first sentence form is not mapped to a fact type:
gather the first sentence form and synonyms including explicit synonyms of the first sentence form from each of the packages as sentence forms in a working set;

compute an identity of the first sentence form;
if the identity maps to a fact type,
    obtain the fact type to which the identity maps;
else create a fact type;
map each of the sentence forms in the working set as a representer of the fact type; and
process placeholders of each of the sentence forms in the working set.

31. The system of claim 30 wherein the instructions causing the processor to process placeholders of each of the sentence forms in the working set comprises instructions that, when executed by the processor, causes the processor to:
    if the first placeholder is from the first sentence form:
        create a role defined by the first placeholder; and
        create an association relating the role to the fact type of the first sentence form,
    else
        if the first placeholder is not from one of the explicit synonyms of the first sentence form:
            set the first placeholder as a representer of role in corresponding ordinal position;
        else
            obtain all placeholders that are mapped to the first placeholder, one of the mapped placeholders representing a role;
            locate the represented role; and
            set the first placeholder as a representer of the located role.

32. The system of claim 27 wherein the instructions causing the processor to process the mathematical function forms included in the packages to map each of the mathematical function forms to a fact type comprises instructions that, when executed by the processor, causes the processor to:
    if the first sentence form is not mapped to a mathematical function:
        gather the first mathematical function form and synonyms including explicit synonyms of the first mathematical function form from each of the packages as mathematical function forms in a working set;
        compute identity of the first mathematical function form;
        if the identity maps to a mathematical function,
            obtain the mathematical function to which the identity maps;
        else create a mathematical function;
        map each of the mathematical function forms in the working set as a representer of the mathematical function; and
        process placeholders of each of the mathematical function forms in the working set;
        obtain function forms to which the mathematical function maps; and
        if one of the function forms is a sentence form representing a fact type:
            create an association indicating that the mathematical function is defined by the fact type represented by the sentence form.

33. The system of claim 32 wherein the instructions causing the processor to process placeholders of each of the mathematical function forms in the working set comprises instructions that, when executed by the processor, causes the processor to:
    if the first placeholder is from the first mathematical function form:
        create an argument represented by the first placeholder, and
        create an association relating the argument to the mathematical function to which the first mathematical function form maps;
    else
        if the first placeholder is not from one of the explicit synonyms of the first mathematical function form:
            set the first placeholder as a representer of a previously created argument in corresponding ordinal position;
        else
            obtain all placeholders that are mapped to the first placeholder, one of the mapped placeholders representing a role;
            locate the represented role; and
            set the first placeholder as a representer of the located role.

34. The system of claim 27 wherein the instructions causing the processor to process the nominal restrictive forms included in the packages comprises instructions that, when executed by the processor, causes the processor to:
    if the first nominal restrictive form is not mapped to a nominal restrictive function:
        gather the first nominal restrictive function form and synonyms including explicit synonyms of the first nominal restrictive function form from each of the packages as nominal restrictive function forms in a working set;
        compute identity of the first nominal restrictive function form;
        if the identity maps to a nominal restrictive function,
            obtain the nominal restrictive function to which the identity maps;
        else create a nominal restrictive function;
        map each of the nominal restrictive function forms in the working set as a representer of the nominal restrictive function; and
        process placeholders of each of the nominal restrictive function forms in the working set; and
        obtain function forms to which the nominal restrictive function maps;
        if one of the function forms is a sentence form representing a fact type:
            create an association indicating that the nominal restrictive function is defined by the fact type represented by the sentence form.

35. The system of claim 34 wherein the instructions causing the processor to process placeholders of each of the nominal restrictive function forms in the working set comprises instructions that, when executed by the processor, causes the processor to:
    if the first placeholder is from the first nominal restrictive function form:
        if the first placeholder is a result:
            create a result represented by the first placeholder, and
            create an association relating the result to the nominal restrictive function to which the first nominal restrictive form maps;
        else
            create an argument represented by the first placeholder, and
            create an association relating the argument to the nominal restrictive function to which the first nominal restrictive form maps;
    else
        if the first placeholder is not from one of the explicit synonyms of the first nominal restrictive form:
            set the first placeholder as a representer of argument or result in corresponding ordinal position;
        else
            obtain all placeholders that are mapped to the first placeholder, one of the mapped placeholders representing a role;
            locate the represented role; and
            set the first placeholder as a representer of the located role.

36. The system of claim 27 wherein the instructions causing the processor to process the identity criteria included in the packages comprises instructions that, when executed by the processor, causes the processor to:
- gather roles associated with an identity criterion included in a package, the identity criterion identifying a term;
- determine whether an identity set associated with the gathered roles already exists;
- if a type identity set associated with the gathered roles does not already exist:
- create a type identity set;
- associate the gathered roles with the type identity set;
- locate the type defined by the identified term;
- create an association relating the type identity set to the located type; and
- set the identity criterion as a representer of the type identity set;
- else
- set the identity criterion as a representer of the type identity set.

37. The system of claim 27 wherein the instructions causing the processor to derive specializations and generalizations for at least one of the types comprises instructions that, when executed by the processor, causes the processor to:
- obtain a first term that represents a first type from one of the packages;
- obtain terms that are defined as a parent or child of the first term; and
- for each of the parent or child terms of the first term, obtain the type associated with the parent or child term.

38. The system of claim 27 wherein the instructions causing the processor to derive specializations and generalizations for at least one of the fact types comprises instructions that, when executed by the processor, causes the processor to:
- obtain a sentence form that represents a first fact type from one of the packages, the sentence form comprising fragments, the fragments including terms and connectors, each of the terms being associated with a type, each of the types having an identity string;
- process the fragments to produce a computed string, the computed string including at least one of the identity strings and one of the connectors;
- search for a fact type corresponding to the computed string;
- if the fact type is found, return the fact type as a generalization or specialization of the first fact type.

39. The system of claim 27 wherein the instructions causing the processor to process the expressions included in the packages to generate logical formulations comprises instructions that, when executed by the processor, causes the processor to:
- replace the name by a modeled instance that the name represents;
- replace the term by the type that the term represents;
- replace the function form by the fact type that the function form represents;
- replace the placeholder by the role that the placeholder either represents directly or maps to indirectly by representing an argument or a result; and
- replace the identity criterion by the type identity set that the identity criterion represents.

\* \* \* \* \*